US006440252B1

(12) United States Patent
Biegelsen et al.

(10) Patent No.: US 6,440,252 B1
(45) Date of Patent: Aug. 27, 2002

(54) METHOD FOR ROTATABLE ELEMENT ASSEMBLY

(75) Inventors: David K. Biegelsen, Portola Valley; Joseph M. Crowley, Morgan Hill; Alexander E. Silverman, Sunnyvale, all of CA (US)

(73) Assignee: Xerox Corporation, Palo Alto, CA (US)

( * ) Notice: Subject to any disclaimer, the term of this patent is extended or adjusted under 35 U.S.C. 154(b) by 0 days.

(21) Appl. No.: 09/465,801

(22) Filed: Dec. 17, 1999

(51) Int. Cl.[7] .............................................. G02F 1/167

(52) U.S. Cl. ................... 156/245; 264/246; 264/297.8; 264/1.7; 335/306; 345/85; 345/86; 156/500

(58) Field of Search .......................... 359/296; 335/303, 335/306; 345/84, 85, 86, 107; 264/1.7, 245, 246, 297.1, 297.8, 250; 156/242, 245, 500

(56) References Cited

U.S. PATENT DOCUMENTS

| 2,326,634 A | 8/1943 | Gebhard et al. ............... 88/82 |
| 2,354,018 A | 7/1944 | Heltzer et al. ................. 88/82 |
| 2,354,048 A | 7/1944 | Palmquist ..................... 40/135 |
| 2,354,049 A | 7/1944 | Palmquist ..................... 40/135 |
| 2,407,680 A | 9/1946 | Palmquist et al. ............. 88/82 |

(List continued on next page.)

FOREIGN PATENT DOCUMENTS

| WO | WO 98/03896 | 1/1998 |
| WO | WO 98/41899 | 9/1998 |
| WO | WO 99/10767 | 3/1999 |

OTHER PUBLICATIONS

L.L. Lee, "A Magnetic–Particles Display," IEEE Transactions on Electron Devices, vol. ED–22, No. 9, Sep. 1975, pp. 758–765.

L.L. Lee, "Fabrication of Magnetic Particle Displays," Proceeding of the S.I.D., vol. 18/3, & 4 1977, pp. 283–288.

(List continued on next page.)

Primary Examiner—Michael W. Ball
Assistant Examiner—Barbara J Musser
(74) Attorney, Agent, or Firm—Finnegan, Henderson, Farabow, Garrett & Dunner, L.L.P.

(57) ABSTRACT

Methods and systems consistent with the present invention can be used to assemble composite rotatable-element components and can be used to form a laminate substrate system, and use a plurality of rotatable-element components or rotatable-element component material of two classes. Each class is defined by a common response or responses to incident electromagnetic radiation of interest. The method for assembling a composite rotatable-element component comprises: dispersing a plurality of rotatable-element components of a first class to first preferred positions on a first carrier; dispersing a plurality of rotatable-element components of a second class to second preferred positions on a second carrier; performing a first manipulation of the first carrier and the second carrier such that one of the plurality of rotatable-element components of a first class and one of the plurality of rotatable-element components of a second class touch at a first contact point; and performing a second manipulation of the rotatable-element components that touch such that they bond to form a composite rotatable-element component. The method for assembling a laminate substrate further comprises: performing a third manipulation of the first carrier and the second carrier such that they touch at a set of second contact points; and performing a fourth manipulation of the first carrier and the second carrier such that they bond to form the laminate substrate.

47 Claims, 23 Drawing Sheets

U.S. PATENT DOCUMENTS

| | | | | |
|---|---|---|---|---|
| 2,600,963 A | 6/1952 | Bland | | 49/58 |
| 2,684,788 A | 7/1954 | Bland | | 222/177 |
| 2,794,301 A | 6/1957 | Law et al. | | 49/84 |
| 2,950,985 A | 8/1960 | d'Adrian | | 117/33 |
| 2,965,921 A | 12/1960 | Bland | | 18/2.5 |
| 2,980,547 A | 4/1961 | d'Adrian | | 106/47 |
| 3,034,177 A | * 5/1962 | Hooper | | 264/250 |
| 3,036,388 A | 5/1962 | Tate | | 35/66 |
| 3,063,388 A | 11/1962 | Magarian et al. | | 105/376 |
| 3,150,947 A | 9/1964 | Bland | | 65/21 |
| 3,222,204 A | 12/1965 | Weber et al. | | 117/27 |
| 3,243,273 A | 3/1966 | Bland | | 65/21 |
| 3,310,391 A | 3/1967 | Law | | 65/21 |
| 3,406,363 A | 10/1968 | Tate | | 335/302 |
| 3,594,065 A | 7/1971 | Marks | | 350/160 |
| 3,615,993 A | 10/1971 | French | | 156/155 |
| 3,617,333 A | 11/1971 | Brown | | 117/35 |
| 3,648,281 A | 3/1972 | Dahms et al. | | 340/373 |
| 3,795,435 A | 3/1974 | Schwab | | 350/105 |
| 3,915,771 A | 10/1975 | Gatzke et al. | | 156/71 |
| 3,982,334 A | 9/1976 | Tate | | 35/66 |
| 4,001,140 A | 1/1977 | Foris et al. | | 252/316 |
| 4,002,022 A | 1/1977 | Lopez | | 58/126 |
| 4,082,426 A | 4/1978 | Brown | | 350/105 |
| RE29,742 E | 8/1978 | Tung | | 2/412 |
| 4,117,192 A | 9/1978 | Jorgensen | | 428/337 |
| 4,117,194 A | 9/1978 | Barbe et al. | | 428/374 |
| 4,126,854 A | 11/1978 | Sheridon | | 340/373 |
| 4,143,103 A | 3/1979 | Sheridon | | 264/4 |
| 4,143,472 A | 3/1979 | Murata et al. | | 35/66 |
| 4,229,732 A | 10/1980 | Hartstein et al. | | 340/378.2 |
| 4,232,084 A | 11/1980 | Tate | | 428/309 |
| 4,253,909 A | 3/1981 | Lee | | 156/654 |
| 4,256,677 A | 3/1981 | Lee | | 3/8 |
| 4,261,653 A | 4/1981 | Goodrich | | 350/362 |
| 4,267,946 A | 5/1981 | Thatcher | | 222/345 |
| 4,268,413 A | 5/1981 | Dabisch | | 252/408 |
| 4,273,672 A | 6/1981 | Vassiliades | | 252/316 |
| 4,283,438 A | 8/1981 | Lee | | 427/47 |
| 4,288,788 A | 9/1981 | Rogers et al. | | 340/378.2 |
| 4,299,880 A | 11/1981 | Arens | | 428/304 |
| 4,367,920 A | 1/1983 | Tung et al. | | 350/105 |
| 4,368,952 A | 1/1983 | Murata et al. | | 350/362 |
| 4,374,889 A | 2/1983 | Arens | | 428/207 |
| 4,381,616 A | 5/1983 | Saxer | | 40/502 |
| 4,402,062 A | 8/1983 | Batchelder | | 365/153 |
| 4,411,973 A | 10/1983 | Gilmour et al. | | 430/7 |
| 4,417,543 A | 11/1983 | Lee | | 118/620 |
| 4,418,098 A | 11/1983 | Maistrovich | | 427/161 |
| 4,418,346 A | 11/1983 | Batchelder | | 340/787 |
| 4,419,383 A | 12/1983 | Lee | | 427/47 |
| 4,438,160 A | 3/1984 | Ishikawa et al. | | 427/214 |
| 4,441,791 A | 4/1984 | Hornbeck | | 350/360 |
| 4,457,723 A | 7/1984 | Tate | | 434/409 |
| 4,492,435 A | 1/1985 | Banton et al. | | 350/360 |
| 4,500,172 A | 2/1985 | Gagnon et al. | | 350/331 R |
| 4,511,210 A | 4/1985 | Tung et al. | | 350/105 |
| 4,532,608 A | 7/1985 | Wu | | 365/127 |
| 4,569,857 A | 2/1986 | Tung et al. | | 427/163 |
| 4,592,628 A | 6/1986 | Altman et al. | | 350/486 |
| 4,627,689 A | 12/1986 | Asher | | 350/362 |
| 4,632,517 A | 12/1986 | Asher | | 350/362 |
| 4,675,476 A | 6/1987 | Kobayashi | | 178/18 |
| 4,678,695 A | 7/1987 | Tung et al. | | 428/120 |
| 4,688,900 A | 8/1987 | Doane et al. | | 350/347 |
| 4,695,528 A | 9/1987 | Dabisch et al. | | 430/290 |
| 4,710,732 A | 12/1987 | Hornbeck | | 332/7.51 |
| 4,713,295 A | 12/1987 | Laroche | | 428/406 |
| 4,721,649 A | 1/1988 | Belisle et al. | | 428/325 |
| 4,725,494 A | 2/1988 | Belisle et al. | | 428/325 |
| 4,729,687 A | 3/1988 | Arens | | 401/198 |
| 4,740,266 A | 4/1988 | Wu | | 156/633 |
| 4,781,789 A | 11/1988 | Wu | | 156/633 |
| 4,781,790 A | 11/1988 | Wu | | 156/633 |
| 4,783,236 A | 11/1988 | Wu | | 156/633 |
| 4,795,243 A | 1/1989 | Suzuki | | 350/362 |
| 4,795,528 A | 1/1989 | Wu | | 156/633 |
| 4,810,431 A | 3/1989 | Leidner | | 264/15 |
| 4,837,071 A | 6/1989 | Tagoku et al. | | 428/195 |
| 4,877,253 A | 10/1989 | Arens | | 273/240 |
| 4,890,902 A | 1/1990 | Doane et al. | | 350/347 |
| 4,919,521 A | 4/1990 | Tada et al. | | 350/362 |
| 4,931,019 A | 6/1990 | Park | | 434/409 |
| 4,948,232 A | 8/1990 | Lange | | 350/334 |
| 4,956,619 A | 9/1990 | Hornbeck | | 330/4.3 |
| 4,991,941 A | 2/1991 | Kalamanash | | 350/347 |
| 4,994,204 A | 2/1991 | Doane et al. | | 252/299.01 |
| 5,039,557 A | 8/1991 | White | | 427/137 |
| 5,066,559 A | 11/1991 | Elmasry et al. | | 430/111 |
| 5,075,186 A | 12/1991 | Sheridon | | 430/47 |
| 5,128,203 A | 7/1992 | LaRoche | | 428/325 |
| 5,131,736 A | 7/1992 | Alvarez | | 359/886 |
| 5,151,032 A | 9/1992 | Igawa | | 434/409 |
| 5,155,607 A | 10/1992 | Inoue et al. | | 359/51 |
| 5,157,011 A | 10/1992 | Okabe et al. | | 503/201 |
| 5,189,658 A | 2/1993 | Moses | | 369/100 |
| 5,219,820 A | 6/1993 | Morohoshi et al. | | 503/204 |
| 5,223,473 A | 6/1993 | Oliver et al. | | 503/226 |
| 5,226,099 A | 7/1993 | Mignardi et al. | | 385/19 |
| 5,233,459 A | 8/1993 | Bozler et al. | | 359/230 |
| 5,249,000 A | 9/1993 | Okabe et al. | | 346/151 |
| 5,251,048 A | 10/1993 | Doane et al. | | 359/51 |
| 5,262,098 A | 11/1993 | Crowley et al. | | 264/8 |
| 5,262,374 A | 11/1993 | Okabe et al. | | 503/201 |
| 5,270,872 A | 12/1993 | Spry | | 359/885 |
| 5,274,460 A | 12/1993 | Yamada et al. | | 358/296 |
| 5,290,066 A | 3/1994 | Mody | | 281/15.1 |
| 5,315,418 A | 5/1994 | Sprague et al. | | 359/41 |
| 5,315,776 A | 5/1994 | Strawbridge et al. | | 40/505 |
| 5,331,454 A | 7/1994 | Hornbeck | | 359/224 |
| 5,344,594 A | 9/1994 | Sheridon | | 264/4.1 |
| 5,351,995 A | 10/1994 | Booker | | 283/117 |
| 5,354,598 A | 10/1994 | Arens | | 428/195 |
| 5,363,222 A | 11/1994 | Ledebuhr | | 359/40 |
| 5,383,008 A | 1/1995 | Sheridon | | 355/256 |
| 5,384,067 A | 1/1995 | Doane et al. | | 252/299.01 |
| 5,389,426 A | 2/1995 | Arens et al. | | 428/195 |
| 5,389,945 A | 2/1995 | Sheridon | | 345/85 |
| 5,397,503 A | 3/1995 | Yuasa et al. | | 252/299.01 |
| 5,411,398 A | 5/1995 | Nakanishi et al. | | 434/409 |
| 5,416,996 A | 5/1995 | Clemens et al. | | 40/502 |
| 5,432,526 A | 7/1995 | Hyatt | | 345/87 |
| 5,432,534 A | 7/1995 | Maruyama et al. | | 347/172 |
| 5,459,602 A | 10/1995 | Sampsell | | 359/234 |
| 5,469,020 A | 11/1995 | Herrick | | 313/511 |
| 5,515,075 A | 5/1996 | Nakagiri et al. | | 345/111 |
| 5,526,016 A | 6/1996 | Nakagiri et al. | | 345/111 |
| 5,535,047 A | 7/1996 | Hornbeck | | 359/295 |
| 5,582,700 A | 12/1996 | Bryning et al. | | 204/450 |
| 5,604,027 A | 2/1997 | Sheridon | | 428/323 |
| 5,627,562 A | 5/1997 | Skodlar | | 345/111 |
| 5,659,330 A | 8/1997 | Sheridon | | 345/84 |
| 5,667,924 A | 9/1997 | Ziolo | | 430/39 |
| 5,703,671 A | 12/1997 | Narita et al. | | 355/32 |
| 5,708,525 A | 1/1998 | Sheridon | | 359/296 |
| 5,717,283 A | 2/1998 | Biegelsen et al. | | 313/483 |
| 5,717,514 A | 2/1998 | Sheridon | | 359/359 |
| 5,717,515 A | 2/1998 | Sheridon | | 359/296 |
| 5,723,204 A | 3/1998 | Stefik | | 428/206 |
| 5,724,064 A | 3/1998 | Stefik et al. | | 345/105 |
| 5,731,792 A | 3/1998 | Sheridon | | 345/84 |

| | | | |
|---|---|---|---|
| 5,737,115 A | 4/1998 | Mackinlay et al. ......... 359/296 |
| 5,739,801 A | 4/1998 | Sheridon ..................... 345/84 |
| 5,739,946 A | 4/1998 | Iwanaga et al. ............ 359/296 |
| 5,751,268 A | 5/1998 | Sheridon .................... 345/107 |
| 5,754,332 A | 5/1998 | Crowley .................... 359/296 |
| 5,757,345 A | 5/1998 | Sheridon ..................... 345/84 |
| 5,760,761 A | 6/1998 | Sheridon .................... 345/107 |
| 5,767,826 A | 6/1998 | Sheridon et al. ............. 345/84 |
| 5,777,782 A | 7/1998 | Sheridon .................... 359/296 |
| 5,784,189 A | 7/1998 | Bozler et al. ............... 359/254 |
| 5,808,593 A | 9/1998 | Sheridon ..................... 345/84 |
| 5,808,783 A | 9/1998 | Crowley .................... 359/296 |
| 5,815,306 A | 9/1998 | Sheridon et al. ........... 359/296 |
| 5,821,624 A | 10/1998 | Pasch ........................ 257/776 |
| 5,825,529 A | 10/1998 | Crowley .................... 359/296 |
| 5,828,441 A | 10/1998 | Narita et al. .................. 355/32 |
| 5,866,284 A | 2/1999 | Vincent ....................... 430/37 |
| 5,869,929 A | 2/1999 | Eida et al. .................. 313/501 |
| 5,877,844 A | 3/1999 | Matsumoto .................. 355/35 |
| 5,891,479 A | 4/1999 | Sheridon ....................... 425/8 |
| 5,892,497 A | 4/1999 | Robertson .................. 345/107 |
| 5,893,206 A | 4/1999 | Furlani et al. ................ 29/608 |
| 5,894,367 A | 4/1999 | Sheridon .................... 359/623 |
| 5,900,192 A | 5/1999 | Richley ......................... 264/8 |
| 5,900,858 A | 5/1999 | Richley ...................... 345/107 |
| 5,904,790 A | 5/1999 | Sheridon ..................... 156/83 |
| 5,906,743 A | 5/1999 | Cohen et al. ............. 210/502.1 |
| 5,914,805 A | 6/1999 | Crowley .................... 359/296 |
| 5,917,646 A | 6/1999 | Sheridon .................... 359/296 |
| 5,919,409 A | 7/1999 | Sheridon ........................ 264/8 |
| 5,922,268 A | 7/1999 | Sheridon .................... 264/437 |
| 5,930,026 A | 7/1999 | Jacobson et al. ........... 359/296 |
| 5,940,054 A | 8/1999 | Harris ......................... 345/85 |
| 5,956,005 A | 9/1999 | Sheridon ..................... 345/84 |
| 5,961,804 A | 10/1999 | Jacobson et al. ........... 204/606 |
| 5,969,472 A | 10/1999 | Kisner ........................ 313/484 |
| 5,974,901 A | 11/1999 | Zborowski et al. ........ 73/865.5 |
| 5,975,680 A | 11/1999 | Wen et al. .................... 347/43 |
| 5,976,428 A | 11/1999 | Richley ....................... 264/10 |
| 5,982,346 A | 11/1999 | Sheridon et al. ............. 345/85 |
| 5,986,629 A | 11/1999 | Smith et al. .................. 345/84 |
| 5,989,629 A | 11/1999 | Sacripante et al. ......... 427/180 |
| 6,014,116 A | 1/2000 | Haynes et al. .................. 345/1 |
| 6,014,247 A | 1/2000 | Winter et al. ................ 359/296 |
| 6,017,584 A | 1/2000 | Albert et al. ............. 427/213.3 |
| 6,034,807 A | 3/2000 | Little et al. .................. 359/227 |
| 6,038,059 A | 3/2000 | Silverman ................... 359/296 |
| 6,054,071 A | 4/2000 | Mikkelsen, Jr. ............. 264/1.36 |
| 6,054,809 A | 4/2000 | Haynes et al. ............... 313/505 |
| 6,055,091 A | 4/2000 | Sheridon et al. ............ 359/296 |
| 6,067,185 A | 5/2000 | Albert et al. ................ 359/296 |
| 6,072,621 A | 6/2000 | Kishi et al. .................. 359/296 |
| 6,097,531 A | 8/2000 | Sheridon .................... 359/296 |
| 6,110,538 A | 8/2000 | Sheridon .................... 427/457 |
| 6,118,419 A | 9/2000 | Smith et al. ................... 345/84 |
| 6,120,588 A | 9/2000 | Jacobson ................. 106/31.16 |
| 6,120,839 A | 9/2000 | Comiskey et al. ........ 427/213.3 |
| 6,122,094 A | 9/2000 | Silverman ................... 359/296 |
| 6,128,124 A | 10/2000 | Silverman ................... 359/296 |
| 6,130,773 A | 10/2000 | Jacobson et al. ........... 359/296 |
| 6,137,467 A | 10/2000 | Sheridon et al. ............ 345/107 |
| 6,147,791 A | 11/2000 | Sheridon .................... 359/296 |
| 6,162,321 A | 12/2000 | Silverman ................... 156/276 |
| 6,174,153 B1 | 1/2001 | Sheridon ........................ 425/3 |
| RE37,085 E | 3/2001 | Sheridon .................... 428/323 |
| 6,197,228 B1 | 3/2001 | Sheridon ................... 264/1.36 |
| 6,211,998 B1 | 4/2001 | Sheridon .................... 359/296 |

OTHER PUBLICATIONS

"Xerox PARC and 3M to collaborate on electronic paper," Information Today, vol. 16, No. 8, Sep. 1999.

Gibbs, "The Reinvention of Paper," Scientific American: Technology and Business, Sep. 1998.

Mattis, "Screen Saviors," Business 2.0, Jul. 1999.

Mann, "Who will own your next good idea?" The Atlantic Monthly, Sep. 1998, vol. 282, pp. 57–82.

Comiskey et al., "An electrophoretic ink for all–printed reflective electronic displays," Nature, Jul. 16, 1998, vol. 394, pp. 253–255.

Klein, "Will the future be written in E–Ink?" The Wall Street Journal, Jan. 4, 2000.

Wisnieff, "Printing Screens," Nature, Jul. 16, 1998, vol. 394, Issue No. 6690, pp. 225 and 227.

* cited by examiner

FIG. 24
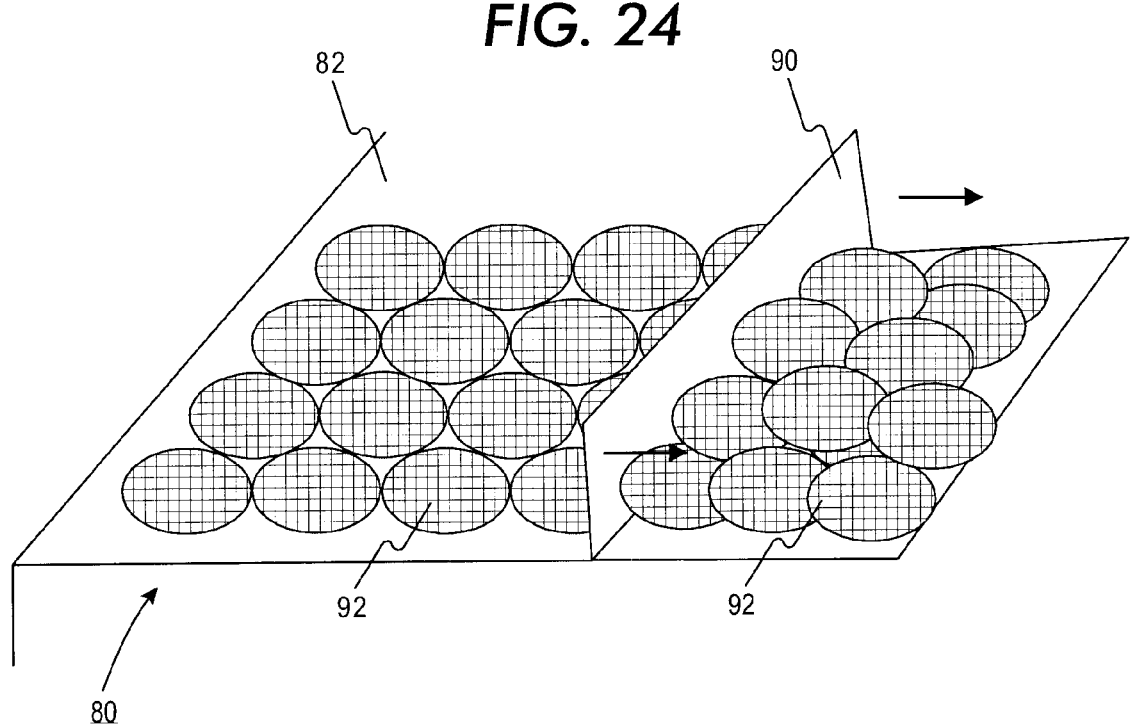
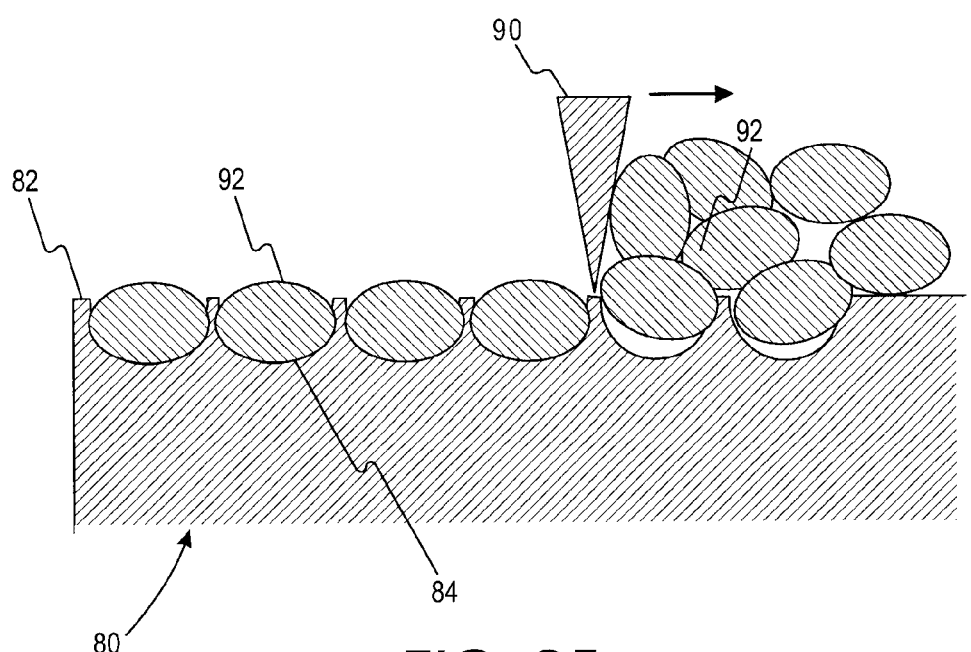
FIG. 25

FIG. 26
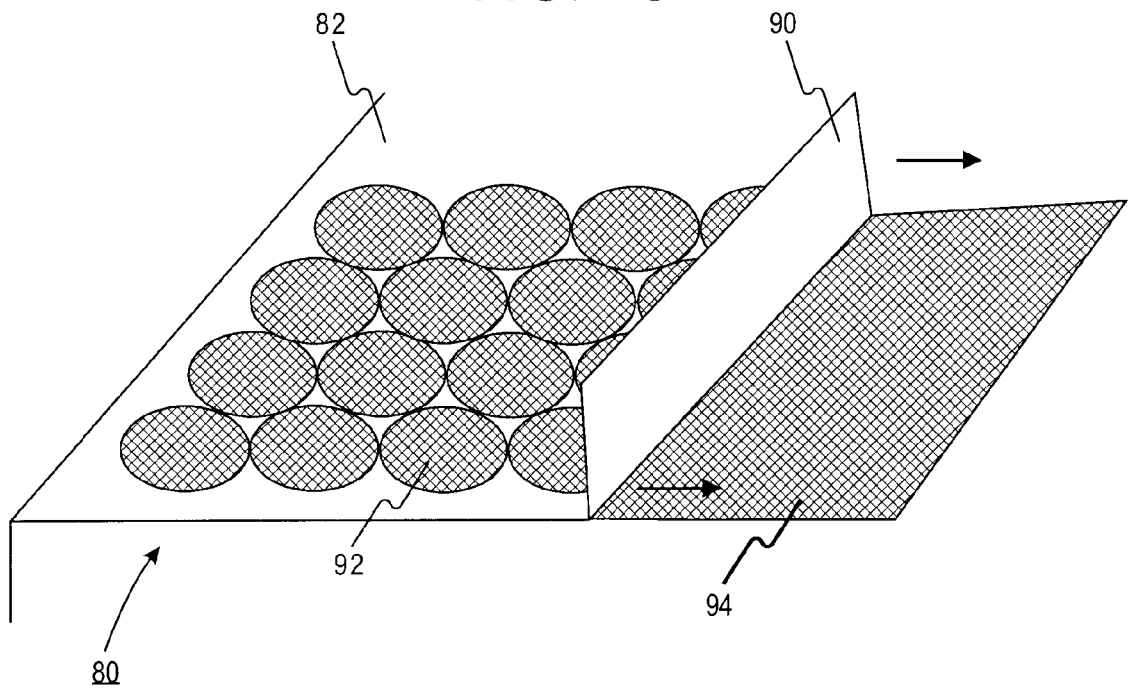
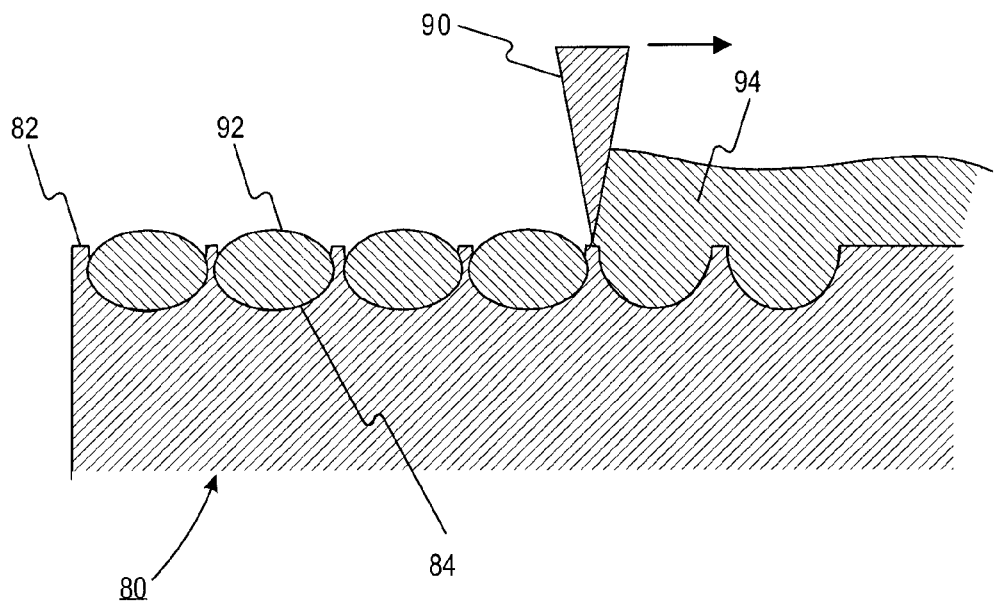
FIG. 27

METHOD FOR ROTATABLE ELEMENT ASSEMBLY

RELATED APPLICATIONS

The following identified United States patent applications are relied upon and are fully incorporated herein by reference:

U.S. patent application entitled "Rotating element sheet material with microstructured substrate and method of use," by John Christopher Knights, filed on May 3, 2000, and accorded Ser. No. 09/563,504.

U.S. patent application entitled "Rotating element sheet material with generalized containment structure," by Nicholas K. Sheridon, filed on Apr. 14, 2000, and accorded Ser. No. 09/549,518.

U.S. patent application entitled "Rotating element sheet material with reversible highlighting," by Alexander E. Silverman, filed on Mar. 2, 2000, and accorded Ser. No. 09/517,522.

I. Field of Invention

The present invention relates to a system and method of assembling rotatable elements and to a system and method of assembling laminate substrates for use in rotating element sheet material.

II. Background of the Invention

Rotating element sheet material has been disclosed in U.S. Pat. Nos. 4,126,854 and 4,143,103, both herein incorporated by reference, and generally comprises a substrate, an enabling fluid, and a class of rotatable elements. As discussed more below, rotating element sheet material has found a use as "reusable electric paper." FIG. 1 depicts an enlarged section of rotating element sheet material 18, including rotatable element 10, enabling fluid 12, cavity 14, and substrate 16. Observer 28 is also shown. Although FIG. 1 depicts a spherically shaped rotatable element and cavity, many other shapes will work and are consistent with the present invention. As disclosed in U.S. Pat. No. 5,389,945, herein incorporated by reference, the thickness of substrate 16 may be of the order of hundreds of microns, and the dimensions of rotatable element 10 and cavity 14 may be of the order of 10 to 100 microns.

In FIG. 1, substrate 16 is an elastomer material, such as silicone rubber, that accommodates both enabling fluid 12 and the class of rotatable elements within a cavity or cavities disposed throughout substrate 16. The cavity or cavities contain both enabling fluid 12 and the class of rotatable elements such that rotatable element 10 is in contact with enabling fluid 12 and at least one translational degree of freedom of rotatable element 10 is restricted. The contact between enabling fluid 12 and rotatable element 10 breaks a symmetry of rotatable element 10 and allows rotatable element 10 to be addressed. The state of broken symmetry of rotatable element 10, or addressing polarity, can be the establishment of an electric dipole about an axis of rotation. For example, it is well known that small particles in a dielectric liquid acquire an electrical charge that is related to the Zeta potential of the surface coating. Thus, an electric dipole can be established on a rotatable element in a dielectric liquid by the suitable choice of coatings applied to opposing surfaces of the rotatable element.

The use of rotating element sheet material 18 as "reusable electric paper" is due to the fact that the rotatable elements are typically given a second broken symmetry, a multivalued aspect, correlated with the addressing polarity discussed above. That is, the above mentioned coatings may be chosen so as to respond to incident electromagnetic energy in distinguishable ways. Thus, the aspect of rotatable element 10 to observer 28 favorably situated can be controlled by an applied vector field.

For example, as disclosed in U.S. Pat. No. 4,126,854, hereinabove incorporated by reference, rotatable element 10 may comprise a black polyethylene generally spherical body with titanium oxide sputtered on one hemisphere, where the titanium oxide provides a light-colored aspect in one orientation. Such a rotatable element in a transparent dielectric liquid will exhibit the desired addressing polarity as well as the desired aspect.

II.A. Rotatable Elements with Two-valued Aspects

A multivalued aspect in its simplest form is a two-valued aspect. When the aspect is the chromatic response to visible light, rotatable element 10 with a two-valued aspect can be referred to as a bichromal rotatable element. Such a rotatable element is generally fabricated by the union of two layers of material as described in U.S. Pat. No. 5,262,098, herein incorporated by reference. FIG. 2 depicts a method of fabricating a rotatable element with a two-valued aspect described in U.S. Pat. No. 5,262,098. Disk 134 rotates about axis 132. First layer material 21 is applied to rotating disk 134 from the bottom while second layer material 23 is applied from the top. The two materials meet at the edge of rotating disk 134 and form ligament 136. When the centrifugal force imparted to the material overcomes the surface tension responsible for the centripetal force, the two materials form rotatable element 10, depicted in FIGS. 2 and 4. One skilled in the art will appreciate that yield rates for rotatable elements of the proper size, and with the proper proportion of first layer material 21 and second layer material 23 are dependent on a variety of factors. FIG. 3 depicts ligament 136 in enlarged form and FIG. 4 depicts the resulting rotatable element 10. By way of example only, rotatable element 10 is depicted as a generally spherical body. As shown in FIGS. 2 and 4, first layer material 21 and second layer material 23 form first layer 20 and second layer 22 respectively of rotatable element 10.

FIGS. 5–8 depict rotatable element 10 and exemplary systems that use such rotatable elements. In FIG. 5, rotatable element 10 is composed of first layer 20 and second layer 22 and is, by way of example again, a generally spherical body. The surface of first layer 20 has first coating 91 at a first Zeta potential, and the surface of second layer 22 has second coating 93 at a second Zeta potential. First coating 91 and second coating 93 are chosen such that, when in contact with a dielectric fluid (not shown), first coating 91 has a net positive electric charge with respect to second coating 93. This is depicted in FIG. 5 by the "+" and "−" symbols respectively. Furthermore, the combination of first coating 91 and the surface of first layer 20 is non-white-colored, indicated in FIG. 5 by hatching, and the combination of second coating 93 and the surface of second layer 22 is white-colored. One skilled in the art will appreciate that the material associated with first layer 20 and first coating 91 may be the same. Likewise, the material associated with second layer 22 and second coating 93 may be the same.

FIG. 6 depicts no-field set 30. No-field set 30 is a subset of randomly oriented rotatable elements in the vicinity of vector field 24 when vector field 24 has zero magnitude. Vector field 24 is an electric field. No-field set 30, thus, contains rotatable elements with arbitrary orientations with respect to each other. Therefore, observer 28 in the case of no-field set 30 registers views of the combination of second coating 93 and the surface of second layer 22, and first coating 91 and the surface of first layer 20 in an unordered sequence. Infralayer 26 forms the backdrop of the aspect. Infralayer 26 can consist of any type of material or aspect source, including but not limited to other rotatable elements, or some material that presents a given aspect to observer 28.

FIG. 7 depicts first aspect set 32. First aspect set 32 is subset of rotatable elements in the vicinity of vector field 24 when the magnitude of vector field 24 is nonzero and has the orientation indicated by arrow 25. In first aspect set 32, all of the rotatable elements orient themselves with respect to arrow 25 due to the electrostatic dipole present on each rotatable element 10. In contrast to no-field set 30, observer 28 in the case of first aspect set 32 registers a view of a set of rotatable elements ordered with the non-white-colored side up. Again, infralayer 26 forms the backdrop of the aspect. An alternate view of first aspect set 32 of FIG. 7 is depicted in FIG. 8. In FIG. 8, the symbol ⊙ indicates an arrow directed out of the plane of the figure. In FIGS. 7 and 8, rotatable element 10, under the influence of applied vector field 24, orients itself with respect to vector field 24 due to the electric charges present as a result of first coating 91 and second coating 93.

One skilled in the art will appreciate that first aspect set 32 will maintain its aspect after applied vector field 24 is removed, in part due to the energy associated with the attraction between rotatable element 10 and the substrate structure, as, for example, cavity walls (not shown). This energy contributes, in part, to the switching characteristics and the memory capability of rotating element sheet material 18, as disclosed in U.S. Pat. No. 4,126,854, hereinabove incorporated by reference.

II.B. Rotatable Elements with Multivalued Aspect

A rotatable element with multivalued aspect is generally fabricated in the same manner as rotatable elements with two-valued aspect. FIG. 9 depicts a method of fabricating a rotatable element with six layers as disclosed in U.S. Pat. No. 5,919,409, herein incorporated by reference. Disk 140, disk 142, and disk 144 all rotate about axis 145. As depicted in FIG. 10, indicating a detailed view of ligament 136, first layer material 21 is applied to rotating disk 140 from the top while second layer material 23 is applied to disk 140 from the bottom. Likewise, third layer material 149 is applied to rotating disk 142 from the top while fourth layer material 151 is applied to disk 142 from the bottom. Finally fifth layer material 153 is applied to rotating disk 144 from the top while sixth layer material 155 is applied to disk 144 from the bottom. The six materials meet at the edge of the rotating disks as depicted in FIGS. 9 and 10, and form ligament 136. When the centrifugal force imparted to the material overcomes the surface tension responsible for the centripetal force, the six materials form rotatable element 10, depicted in FIGS. 9 and 11. Again, one skilled in the art will appreciate that yield rates for rotatable elements of the proper size, and with the proper proportion of all six layers of material are dependent on a variety of factors.

An exemplary rotatable element 10 of FIG. 9 is depicted in FIG. 11. As shown in FIGS. 9–11, first layer material 21 forms first layer 20, second layer material 23 forms second layer 22, third layer material 149 forms third layer 148, fourth layer material 151 forms fourth layer 150, fifth layer material 153 forms fifth layer 152, and sixth layer material 155 forms sixth layer 154, of rotatable element 10.

One skilled in the art will appreciate that the choice of the six materials presented here can be manipulated so as to create a rotatable element with two-valued aspect, three-valued aspect, and so-on. For example, if first layer material 21, second layer material 23, and third layer material 149 are all chosen so as to be a first aspect material, and fourth layer material 151, fifth layer material 153, and sixth layer material 155 are all chosen so as to be a second aspect material, then rotatable element 10 of FIG. 11 will have all the usual properties of a rotatable element with a two-valued aspect as presented in FIGS. 2–8. Thus, other choices and combinations of the six materials are apparent to one skilled in the art.

Rotatable elements with multivalued aspect are generally utilized in rotating element sheet material that use canted vector fields for addressing. A canted vector field is a field whose orientation vector in the vicinity of a subset of rotatable elements can be set so as to point in any direction in three-dimensional space. U.S. Pat. No. 5,717,515, herein incorporated by reference, discloses the use of canted vector fields in order to address rotatable elements. The use of canted vector fields with rotating element sheet material 18 allows complete freedom in addressing the orientation of a subset of rotatable elements, where the rotatable elements have the addressing polarity discussed above. Exemplary systems utilizing rotatable elements with three-valued aspects and canted vector fields for addressing are depicted in FIGS. 12–21.

In FIGS. 12–16, second layer 22 separates first layer 20 and third layer 38 in rotatable element 10. As depicted in FIG. 12, the surface of third layer 38 has third coating 95 at a first Zeta potential, and the surface of first layer 20 has first coating 91 at a second Zeta potential such that third coating 95 has a net positive charge, "+," with respect to first coating 91 when rotatable element 10 is in contact with a dielectric fluid (not shown). As above, one skilled in the art will appreciate that the material associated with first layer 20 and first coating 91 may be the same. Likewise, the material associated with third layer 38 and third coating 95 may be the same. The combination of first coating 91 and the surface of first layer 20 is white-colored, and the combination of third coating 95 and the surface of third layer 38 is a first non-white-color, indicated in FIG. 12 by hatching. The surface of second layer 22 is a second non-white color, indicated in FIG. 12 by perpendicular hatching.

In FIG. 13, no-field set 50 depicts a subset of randomly oriented rotatable elements in the vicinity of vector field 24 when vector field 24 has zero magnitude. In no-field set 50, the rotatable elements have arbitrary orientations. Therefore, observer 28 in the case of no-field set 50 registers views of the combination of the surface of first layer 20 and first coating 91, the surface of second layer 22, and the combination of the surface of third layer 38 and third coating 95 in an unordered sequence. Again, infralayer 26 forms the backdrop of the aspect.

FIG. 14 depicts first aspect set 52 of the system introduced in FIGS. 12 and 13. In first aspect set 52, observer 28 registers a coherent view of the combination of the surface of third layer 38 and third coating 95. In first aspect set 52, all of the rotatable elements orient themselves such that the combination of the surface of third layer 38 and third coating 95 lie in the direction indicated by arrow 25, where arrow 25 indicates the direction of vector field 24.

FIG. 15 depicts second aspect set 54 of the system introduced in FIGS. 12 and 13. In second aspect set 54, observer 28 registers a coherent view of the combination of the surface of first layer 20 and first coating 91. In second aspect set 54, all of the rotatable elements orient themselves such that the combination of the surface of third layer 38 and third coating 95 lie in the direction indicated by arrow 25, where arrow 25 indicates the direction of vector field 24.

Finally, FIG. 16 depicts third aspect set 56 of the system introduced in FIGS. 12 and 13. In third aspect set 56, observer 28 registers a coherent view of the surface of second layer 22 as well as portions of the combination of the surface of first layer 20 and first coating 91, and the combination of the surface of third layer 38 and third coating 95. Again, in third aspect set 56, all of the rotatable elements orient themselves such that the surface of third layer 38 lies in the direction indicated by arrow 25, where arrow 25 indicates the direction of vector field 24. The use of a canted vector field, thus, allows for the utilization of more than two aspects of a rotatable element.

Again, one skilled in the art will appreciate that first aspect set 52, second aspect set 54, and third aspect set 56 will maintain their aspect after applied vector field 24 is removed due to the energy associated with the attraction between rotatable element 10 and the substrate structure, as, for example, cavity walls (not shown). This energy contributes, in part, to the switching characteristics and the memory capability of rotating element sheet material 18, as disclosed in U.S. Pat. No. 4,126,854, hereinabove incorporated by reference.

In FIGS. 17–21, rotatable element 10 with a multivalued aspect is a "light valve," as disclosed, for example, in U.S. Pat. No. 5,767,826, herein incorporated by reference. Rotatable element 10 in FIG. 17 is composed of first layer 20, second layer 22 and third layer 38. First layer 20 and third layer 38 are transparent to visible light and second layer 20 is opaque to visible light. The surface of third layer 38 has third coating 95 at a first Zeta potential, and the surface of first layer 20 has first coating 91 at a second Zeta potential such that third coating 95 has a net positive charge, "+," with respect to first coating 91 when rotatable element 10 is in contact with a dielectric fluid (not shown). First coating 91 and third coating 95 are also chosen to be transparent to visible light. As above, one skilled in the art will appreciate that the material associated with first layer 20 and first coating 91 may be the same. Likewise, the material associated with third layer 38 and third coating 95 may be the same.

FIG. 18 depicts no-field set 70. No-field set 70 is a subset of randomly oriented rotatable elements in the vicinity of vector field 24 with zero magnitude. In no-field set 70, the rotatable elements have arbitrary orientations. Therefore, observer 28 in the case of no-field set 70 registers views of the disk corresponding to second layer 22 in unordered orientations and infralayer 26, where infralayer 26 forms the backdrop of the aspect. Again, infralayer 26 can consist of any type of material or aspect source, including but not limited to other rotatable elements, or some material that presents a given aspect to observer 28.

FIG. 19 depicts first aspect set 72 of the system introduced in FIGS. 17 and 18. In first aspect set 72, observer 28 registers a coherent view of the face of the disk of opaque second layer 22.

FIG. 20 depicts second aspect set 74 of the system introduced in FIGS. 17 and 18. In second aspect set 74, observer 28 again registers a coherent view of the face of the disk of opaque second layer 22. Both first aspect set 72 of FIG. 19 and second aspect set 74 of FIG. 20 maximally obstruct infralayer 26, where infralayer 26 can be any type of material or aspect source, including but not limited to other rotatable elements, or some material that presents a given aspect to observer 28. Such a case corresponds to the case of a "closed" light valve.

Finally, FIG. 21 depicts third aspect set 76 of the system introduced in FIGS. 17 and 18. In third aspect set 76, observer 28 registers a coherent view of the disk of opaque second layer 22 edge-on. In this case, infralayer 26 is minimally obstructed by the set of rotatable elements. Such a case corresponds to the case of a light valve that is "open."

One skilled in the art will appreciate that first aspect set 72, second aspect set 74, and third aspect set 76 will maintain their aspect after applied vector field 24 is removed due to the energy associated with the attraction between rotatable element 10 and the substrate structure, as, for example, cavity walls (not shown). Again, this energy contributes, in part, to the switching characteristics and the memory capability of rotating element sheet material 18, as disclosed in U.S. Pat. No. 4,126,854, hereinabove incorporated by reference.

In addition, one skilled in the art will appreciate that no-field set, first aspect set, second aspect set, and third aspect set discussed above in FIGS. 6–8, 13–16, and 18–21 can form the elements of a pixel, where vector field 24 can be manipulated on a pixel by pixel basis using an addressing scheme as discussed, for example, in U.S. Pat. No. 5,717, 515, hereinabove incorporated by reference.

Still further, one of skill in the art will appreciate that although opaque second layer 22 is depicted in FIGS. 17–21 as presenting the same aspect in first aspect set 72 and second aspect set 74, second layer 22 may itself have a two-valued aspect such that the orientation associated with first aspect set 72 in FIG. 19 presents a black-colored aspect, while the orientation associated with second aspect set 74 in FIG. 20 presents a light-colored aspect. Such an effect, for example, is achieved when second layer 22 comprises a black-colored disk and a light-colored disk that are stacked as along a common cylindrical axis.

In light of the foregoing, it remains desirable to fabricate and assemble rotatable elements with multivalued aspects for use in rotating element sheet material using a technique with a yield rate that does not depend on the complex processes depicted in FIGS. 2–4 and 9–11, and discussed in U.S. Pat. Nos. 5,262,098 and 5,919,409 respectively, both hereinabove incorporated by reference.

II.C. Laminate Substrate System and Method

A desired property of rotating element sheet material as reusable electric paper is a high overall ratio of effective aspect area to surface area. With respect to chromatic properties, this is related to reflectance and transmittance. Reflectance of currently available reusable electric paper is around 15 to 20%. Reflectance of ordinary paper, however, is of the order of 85%. U.S. Pat. No. 5,808,783, herein incorporated by reference, discloses a method of improving the ratio of effective aspect area to surface area for rotating element sheet material 18 through the use of a dense monolayer of rotatable elements. The arrangement of a dense monolayer of rotatable elements can be made dependent upon the geometry of the cavities contained within substrate 16. U.S. Pat. No. 5,815,306, herein incorporated by reference, discloses an "eggcrate" substrate suitable for transmissive-type aspects. Thus, it remains desirable to fabricate substrate 16 such that it can accommodate a dense monolayer of rotatable elements. Furthermore, it remains desirable to precisely position composite rotatable-element components to form the dense monolayer within substrate 16.

III. SUMMARY OF THE INVENTION

Accordingly, in one embodiment of the present invention, composite rotatable-element components are assembled from rotatable-element components through the use of two carriers with microstructured surfaces so as to accommodate rotatable-element components of a first class on a first carrier microstructured surface, and rotatable-element components of a second class on a second carrier microstructured surface. The two carriers are aligned and coupled such that, through the application of pressure and temperature either individually or together, composite rotatable-element components are formed.

In another embodiment of the present invention, composite rotatable-element components are assembled from rotatable-element components through the use of two carriers with microstructured surfaces so as to accommodate rotatable-element components of a a first class on a first carrier microstructured surface, and rotatable-element components of a second class on a second carrier microstructured surface. The rotatable-element components of each class are treated so as to preferentially bond to a rotatable-element component of a different class, and to bond only weakly, if at all, to a rotatable-element component of their own class. For example, the rotatable-element components can be treated electrically, magnetically, or chemically to accomplish such preferred bonding. The two carriers are aligned and coupled such that composite rotatable-element components are formed based on a minimization of the potential energy of interest associated with the bonding force.

In another embodiment of the present invention, composite rotatable-element components are assembled from rotatable-element components through the use of two carriers with microstructured surfaces so as to accommodate rotatable-element components of a first class on a first carrier microstructured surface, and rotatable-element components of a second class on a second carrier microstructured surface. The rotatable-element components of each class are treated so as to preferentially bond to a rotatable-element component of a different class, and to bond only weakly, if at all, to a rotatable-element component of their own class. For example, the rotatable-element components can be treated either electrically, magnetically, or chemically. The two classes are then dispersed into a mixing chamber and allowed to self-assemble such that composite rotatable-element components are formed based on a minimization of the potential energy of interest associated with the bonding force.

In another embodiment of the present invention, rotatable-element components of a first class and of a second class are created by any convenient means. The rotatable-element components of each class are treated so as to bond to a rotatable-element component of a different class, but to bond only weakly, if at all, to a rotatable-element component of their own class. For example, the rotatable-element components can be treated either electrically, magnetically, or chemically. The two classes are then dispersed into a mixing chamber and allowed to self-assemble such that composite rotatable-element components are formed based on a minimization of the potential energy of interest associated with the bonding force.

Still further, in another embodiment of the present invention, a laminate substrate containing a dense monolayer of composite rotatable-element components is created by the union of two carriers such that the combined microstructured surfaces form the containment structure within the laminate substrate. Furthermore, the rotatable-element components positioned within the microstructured carrier surfaces are bonded to form the desired composite rotatable-element components within the containment structure.

Additional features and advantages of the invention will be set forth in the description that follows, and in part will be apparent from the description, or may be learned by practice of the invention. The objectives and other advantages of the invention will be realized and attained by the process and apparatus particularly pointed out in the written description and claims herein as well as the appended drawings.

IV. BRIEF DESCRIPTION OF DRAWINGS

The accompanying drawings, which are incorporated in and constitute a part of this specification, illustrate an implementation of the invention and, together with the description, serve to explain the advantages and principles of the invention. In the drawings, FIG. 1 depicts an exemplary subsection of rotating element sheet material of the prior art.

FIG. 24 depicts a perspective view of an exemplary carrier and rotatable-element components being positioned into carrier microrecesses consistent with the present invention.

FIG. 25 depicts a cross section view of the exemplary system of FIG. 24.

FIG. 26 depicts a perspective view of an exemplary carrier and liquid or melt rotatable-element component material being positioned into carrier microrecesses consistent with the present invention.

FIG. 27 depicts a cross section view of the exemplary system of FIG. 26.

V. DETAILED DESCRIPTION

Figure 1:
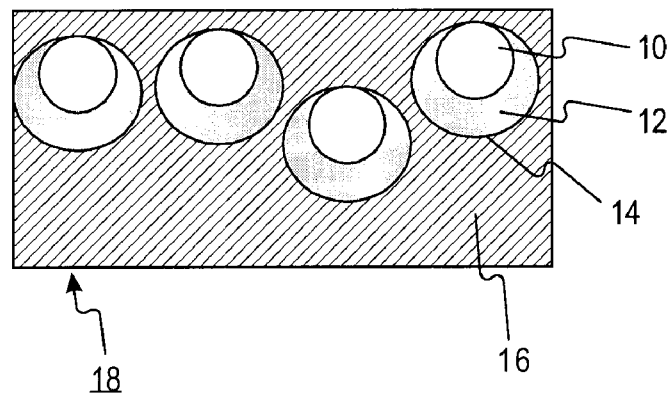
Figure 2:
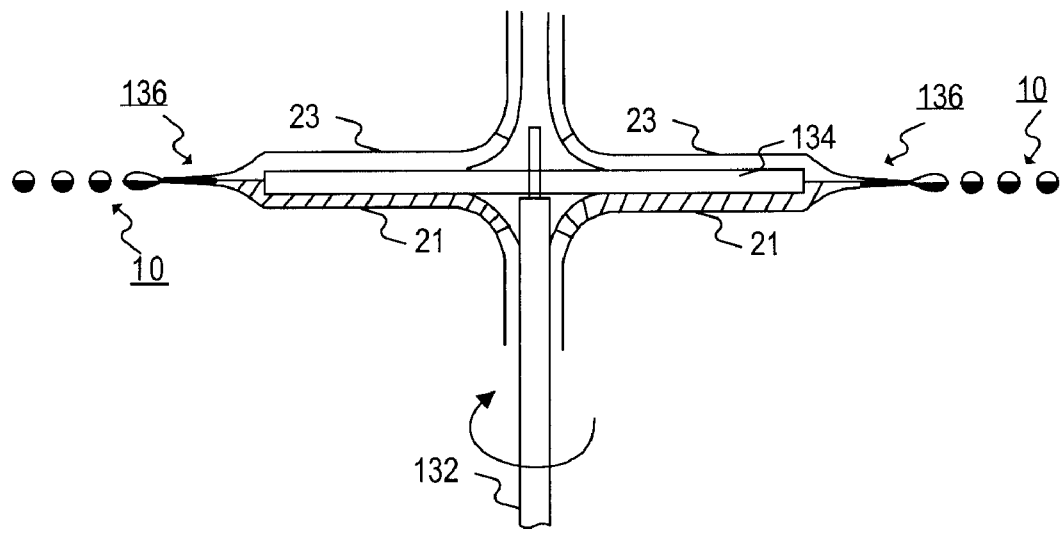
FIG. 2 depicts a method of fabricating rotatable elements with two-valued aspects from the prior art.
Figure 3:
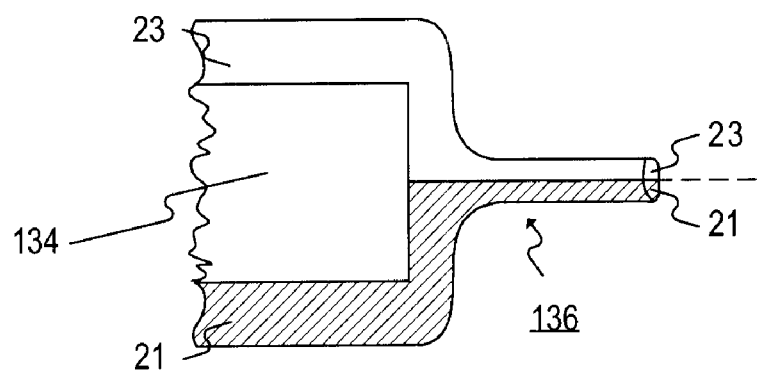
FIG. 3 depicts a portion of the disk and ligament of FIG. 2 from the prior art.
Figure 4:
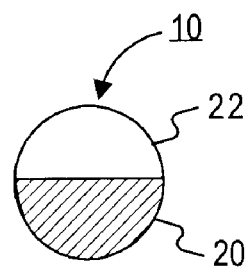
FIG. 4 depicts a close-up of the rotatable element from FIG. 2.
Figure 5:
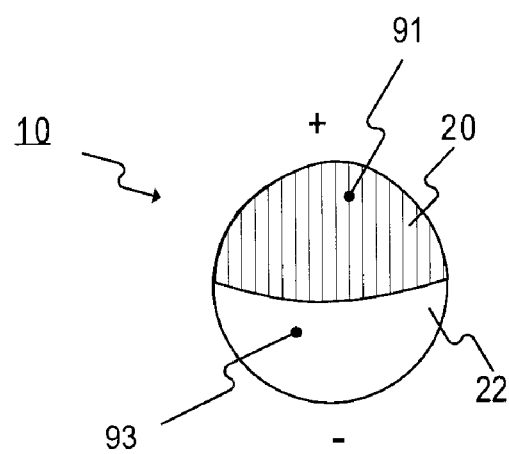
FIG. 5 depicts an exemplary rotatable element with a two-valued aspect.
Figure 6:
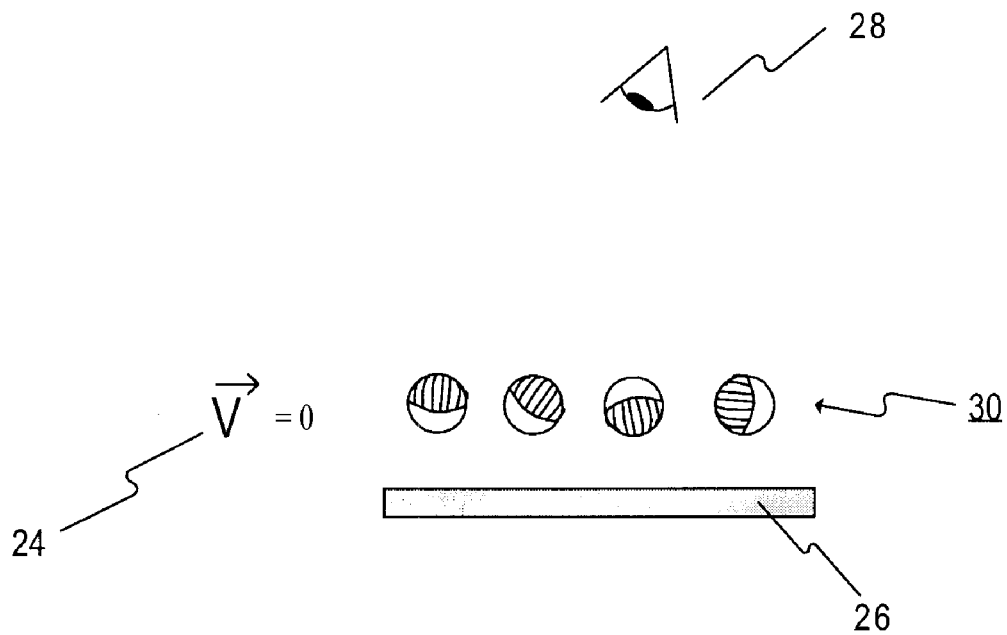
FIG. 6 depicts an exemplary system that uses rotatable elements with two-valued aspects randomly oriented in the presence of an addressing vector field with zero magnitude.
Figure 7:
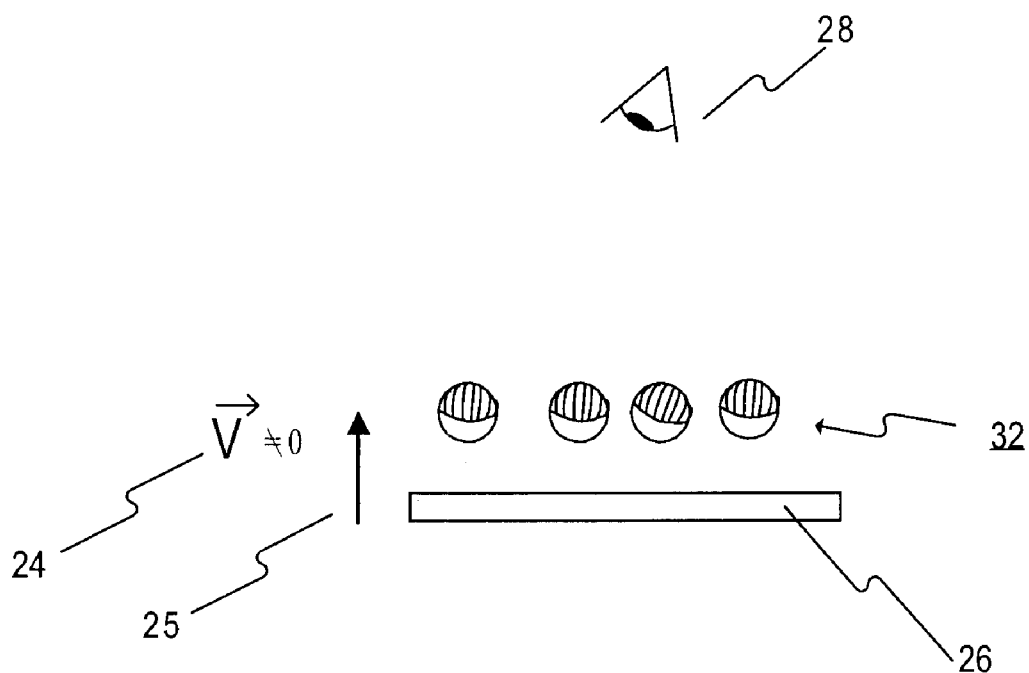
FIG. 7 depicts the exemplary system of FIG. 6 in the presence of a non-zero addressing vector field.
Figure 8:
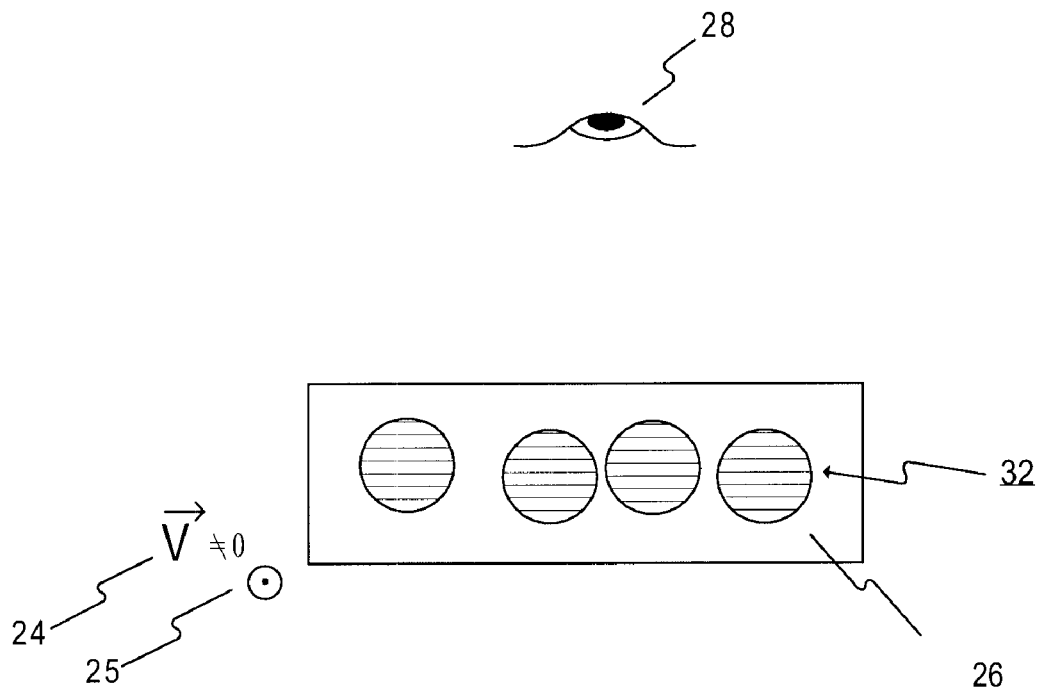
FIG. 8 depicts an alternate view of the system of FIG. 7 in the presence of a non-zero addressing vector field.
Figure 9:
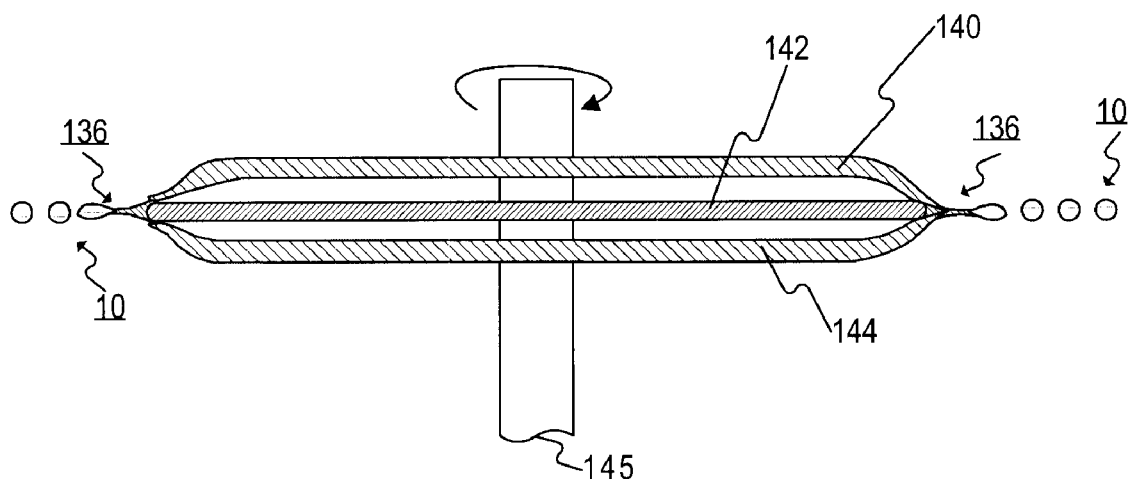
FIG. 9 depicts a method of fabricating rotatable elements with multivalued aspects from the prior art.
Figure 10:
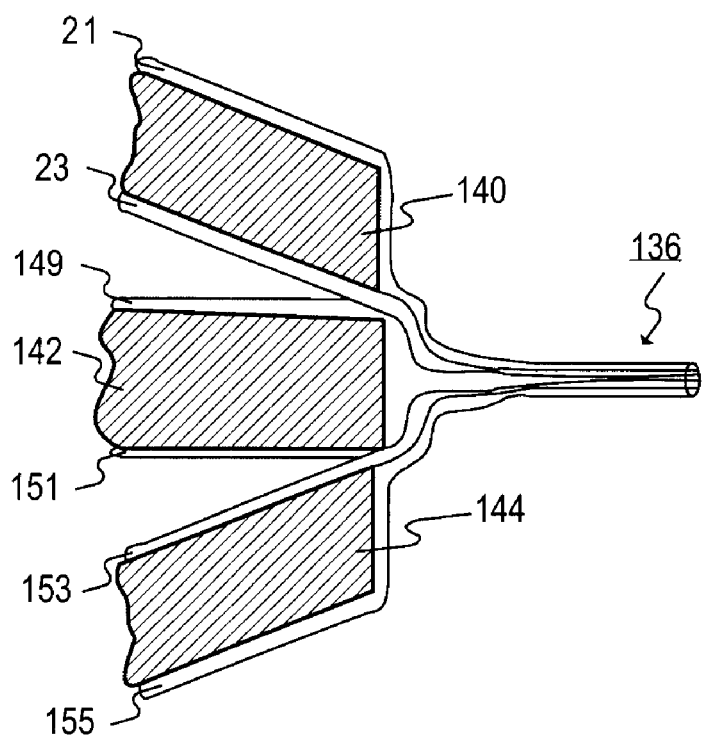
FIG. 10 depicts a portion of the disks and ligament of FIG. 9 from the prior art.
Figure 11:
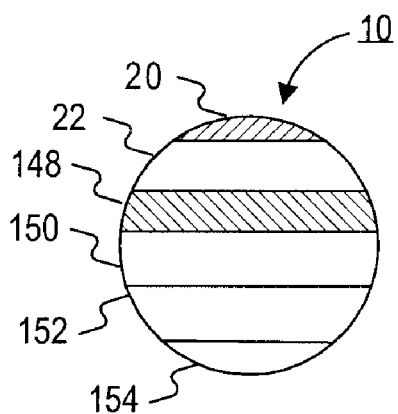
FIG. 11 depicts a close-up of the rotatable element from FIG. 9.
Figure 12:
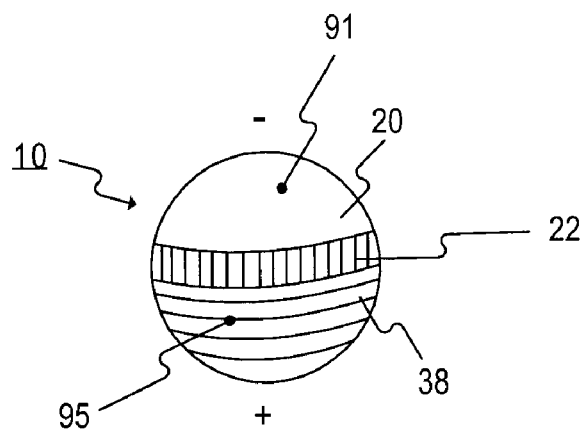
FIG. 12 depicts a first exemplary rotatable element with a multivalued aspect.
Figure 13:
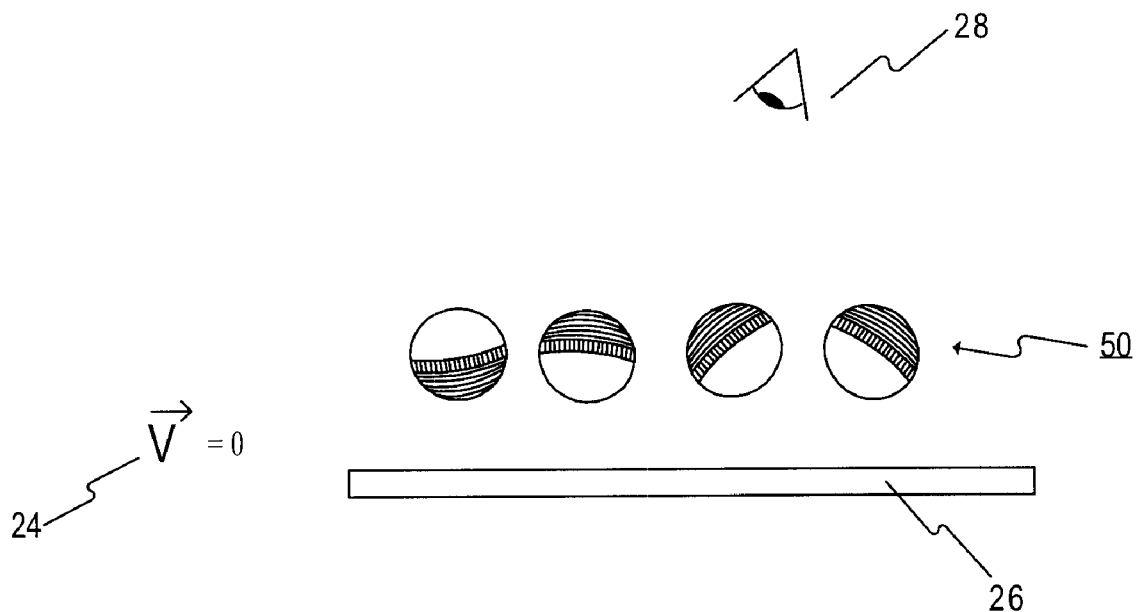
FIG. 13 depicts a first exemplary system that uses rotatable elements with multivalued aspects randomly oriented in the presence of a canted vector field for addressing with zero magnitude.
Figure 14:
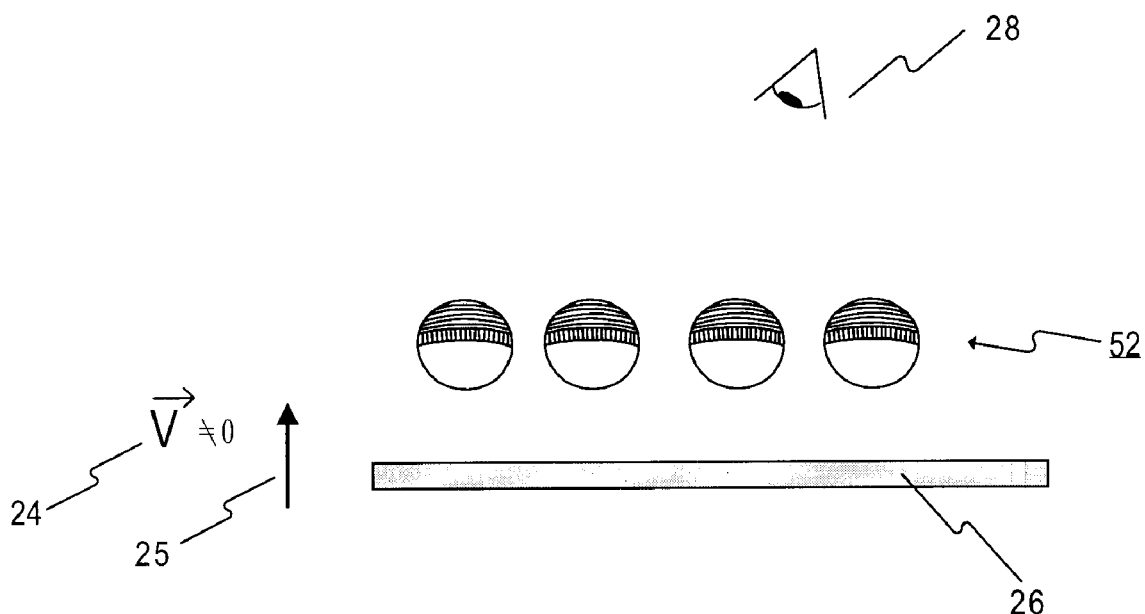
FIG. 14 depicts the exemplary system of FIG. 13 in the presence of a canted vector field for addressing with non-zero magnitude.
Figure 15:
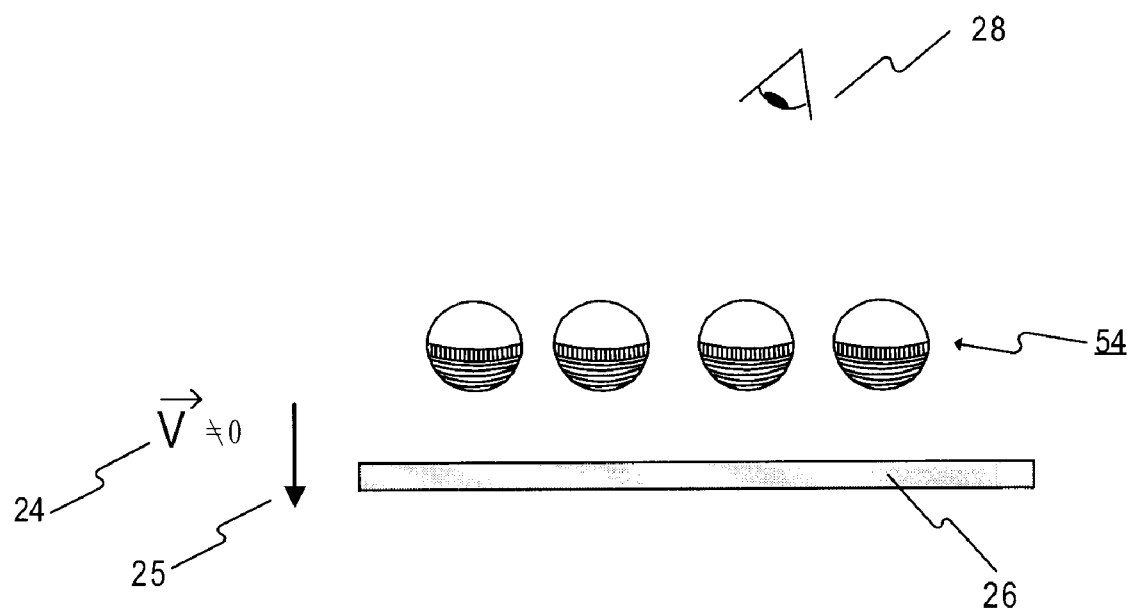
FIG. 15 depicts the exemplary system of FIG. 13 in the presence of a canted vector field for addressing with non-zero magnitude.
Figure 16:
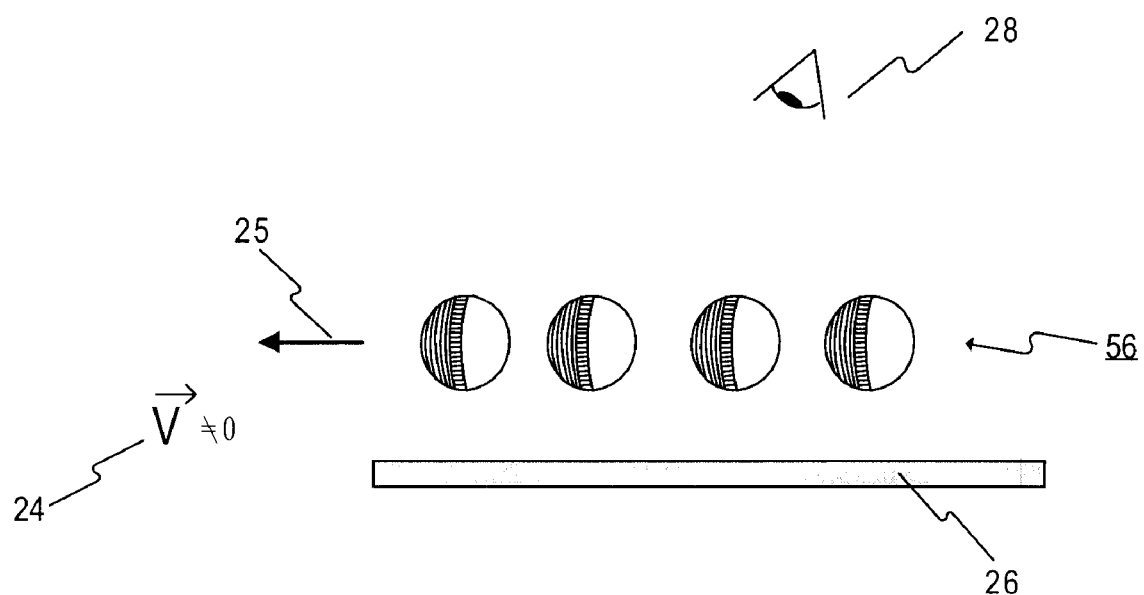
FIG. 16 depicts the exemplary system of FIG. 13 in the presence of a canted vector field for addressing with non-zero magnitude.
Figure 17:
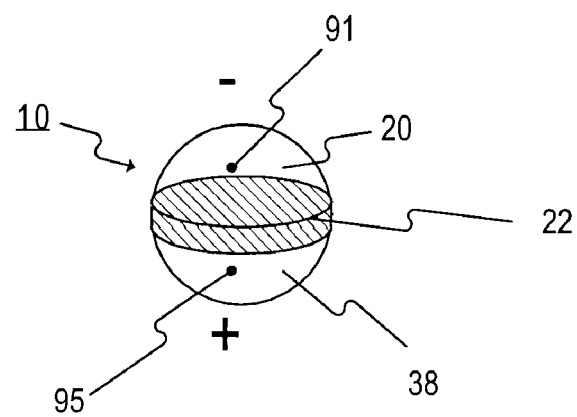
FIG. 17 depicts a second exemplary rotatable element with a multivalued aspect.
Figure 18:
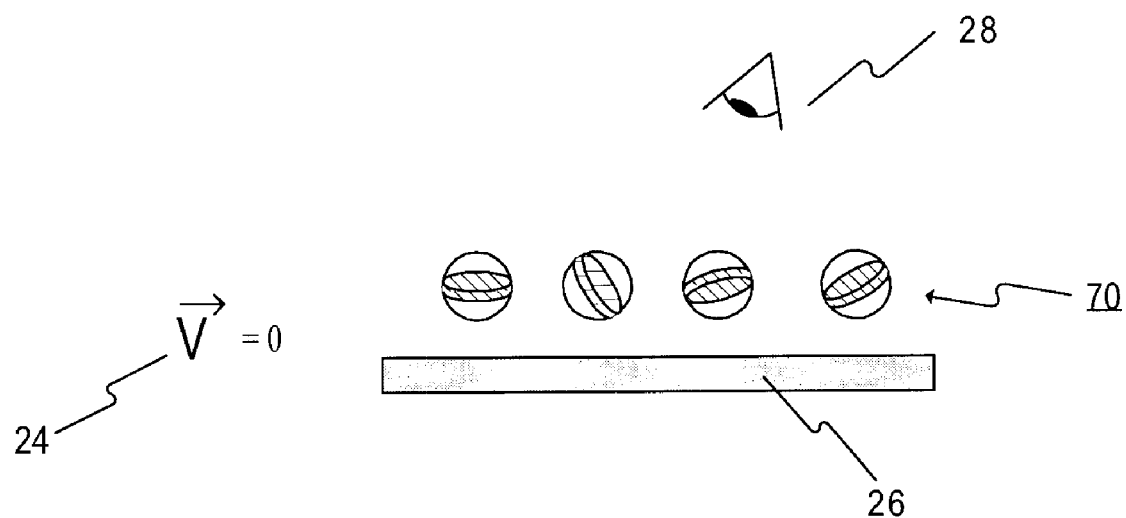
FIG. 18 depicts a second exemplary system that uses rotatable elements with multivalued aspects randomly oriented in the presence of a canted vector field for addressing with zero magnitude.
Figure 19:
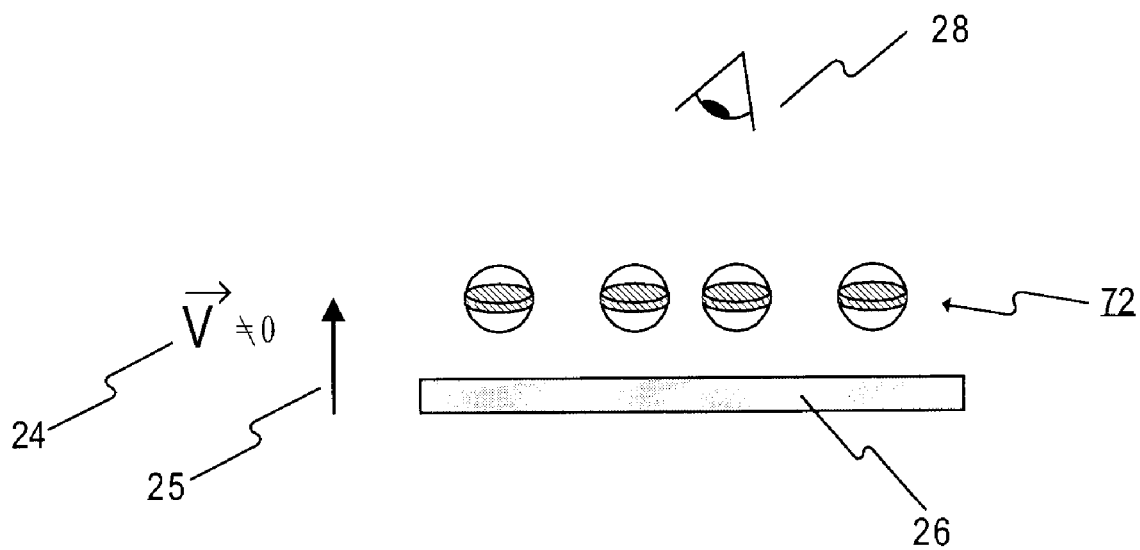
FIG. 19 depicts the exemplary system of FIG. 18 in the presence of a canted vector field for addressing with non-zero magnitude.
Figure 20:
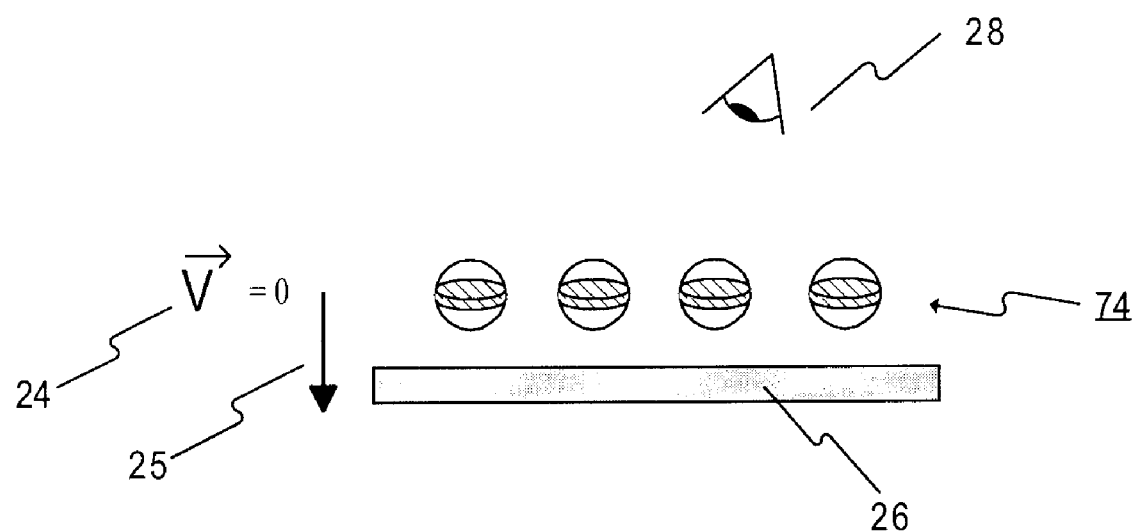
FIG. 20 depicts the exemplary system of FIG. 18 in the presence of a canted vector field for addressing with non-zero magnitude.
Figure 21:
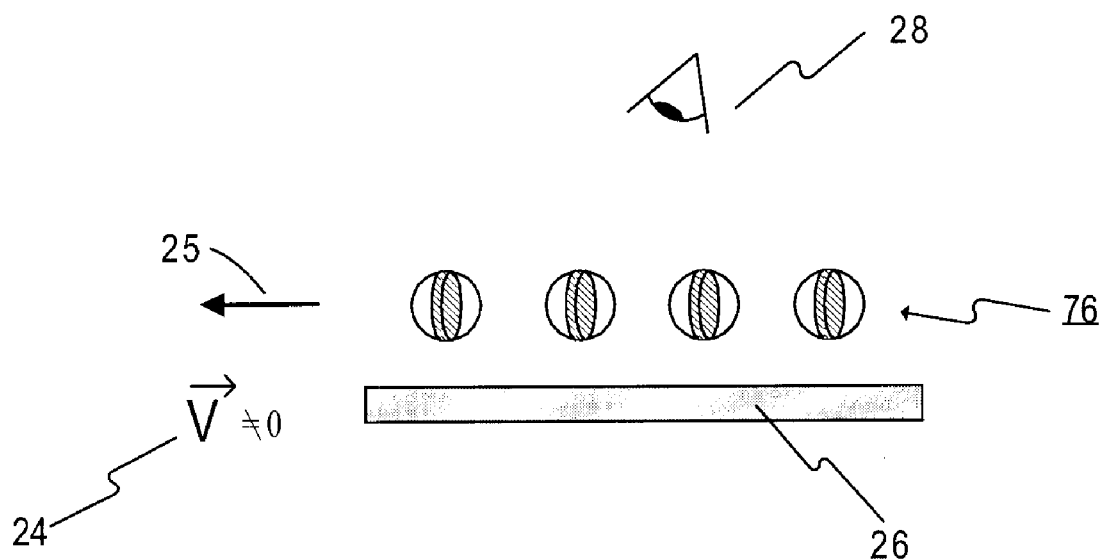
FIG. 21 depicts the exemplary system of FIG. 18 in the presence of a canted vector field for addressing with nonzero magnitude.

Reference will now be made in detail to an implementation consistent with the present invention as illustrated in the accompanying drawings. Whenever possible, the same reference number will be used throughout the drawings and the following description to refer to the same or like parts.

V.A. Definitions

As used herein, "aspect" refers to a common response to incident electromagnetic energy of interest. For example, if the incident electromagnetic energy of interest lies in the visible spectrum, then a first aspect can correspond to a black appearance, and a second aspect can correspond to a white appearance. If the incident electromagnetic energy of interest lies in the x-ray region, then a first aspect can correspond to the transmission of the x-ray energy, while a second aspect can correspond to the absorption of the x-ray energy. Furthermore, the "common response" can consist of any of the phenomena of absorption, reflection, polarization, transmission, fluorescence or any combination thereof.

As used herein, "observer" refers to a human perceiver, or to a human perceiver in conjunction with an apparatus sensitive to the electromagnetic energy of interest. If the electromagnetic energy of interest lies in the visible spectrum, then observer can refer to a human perceiver. If the electromagnetic energy of interest lies outside of the visible spectrum, then observer refers to an apparatus sensitive to the electromagnetic energy and capable of resolving the aspects of interest into human perceivable form.

As used herein, "carrier" refers to an apparatus for maintaining rotatable-element components in preferred positions.

As used herein, "composite rotatable-element components" refer to the elements formed by the bonding of rotatable-element components. One skilled in the art will appreciate that rotatable-element components themselves may be composite rotatable-element components from a prior bonding of rotatable-element components.

As used herein, "diameter" refers to an order of magnitude dimension corresponding to any of height, width, and depth of any of rotatable elements, rotatable-element components, composite rotatable-element components, or microrecesses. The use of "diameter" does not imply that circular or spherical geometry only is under consideration.

As used herein, "vector field" refers to a field whose amplitude in space is capable of having a magnitude and a direction. Vector fields of interest in the present invention include electric fields, magnetic fields, or electromagnetic fields.

As used herein, "wettable" refers to the property of a surface to increase the spreading or wetting power of a liquid or melt in contact with the surface. Likewise "nonwettable" refers to the property of a surface to decrease the spreading or wetting power of a liquid or melt in contact with the surface. Thus, a liquid or melt on a surface will "bead" according to the location of the wettable regions with respect to the nonwettable regions of the surface.

As used herein, "potential energy of interest" refers to the potential energy corresponding to the force of attraction or repulsion associated with electric charges, magnetic dipoles, chemical interactions, and any contributory forces that correspond to a gravitational field. The forces associated with "potential energy of interest" includes van der Waals' forces, electrostatic forces, magnetostatic forces, and any force based on chemical attraction or repulsion, such as chemical adhesion. Furthermore, "potential energy of interest" as the basis for a self-assembly force may also include contributions from gravitational potential energy. As a potential energy associated with attraction, potential energy of interest is characterized by a strong attraction between near objects that falls off as a function of distance. Similarly, as a potential energy associated with a force of repulsion, potential energy of interest is characterized by a strong repulsion between near objects that falls off as a function of distance.

As used herein, "adhesion-promoting layer" refers to a layer or coating of material as part of a rotatable-element component with the property that it preferentially attracts or repels other adhesion-promoting layers, and thus contributes in part to the potential energy of interest defined above. An example of an adhesion-promoting layer includes a layer of material with excess electric charge formed by charge injection, as, for example, electrets.

V.B. Rotatable Element Assembly System and Methods

Systems and methods in one embodiment of the present invention generate composite rotatable-element components for use in rotating element sheet material.

V.B.1. Rotatable-element Components

In a preferred embodiment of the present invention, a method of fabricating composite rotatable-element components utilizes two classes of rotatable-element components.

Membership in a class is determined by the common aspect or aspects of a rotatable-element component. For example, if the incident electromagnetic energy of interest is visible light, then a first rotatable-element component of a first class may consist of white-colored components and a second rotatable-element component of a second class may consist of black-colored components. A rotatable-element component does not have to be uniform in aspect, however. The rotatable-element component itself may have a multi-valued aspect. For example, the component itself may be multilayered. The rotatable-element components are created by any convenient means and may be of the order of 10 to 100 microns in diameter. Suitable materials for creating rotatable-element components include polyethylene, polyester, carnuba wax, castor wax, or other materials such as epoxy. Such materials can also be replaced by, or contain, pigments, ferroelectric ceramics such as lead zirconate titanate, or ferromagnetic materials such as iron oxide.

V.B.2. Carriers

Figure 22:
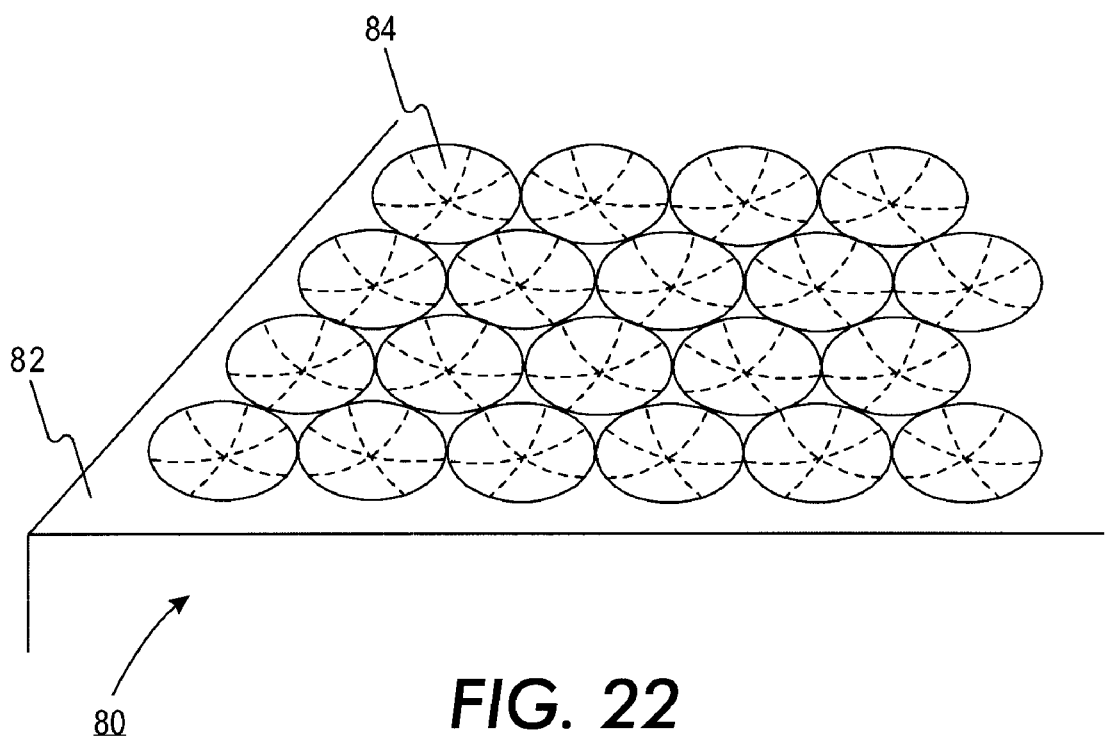
FIG. 22 depicts a perspective view of an exemplary carrier consistent with the present invention.
Figure 23:
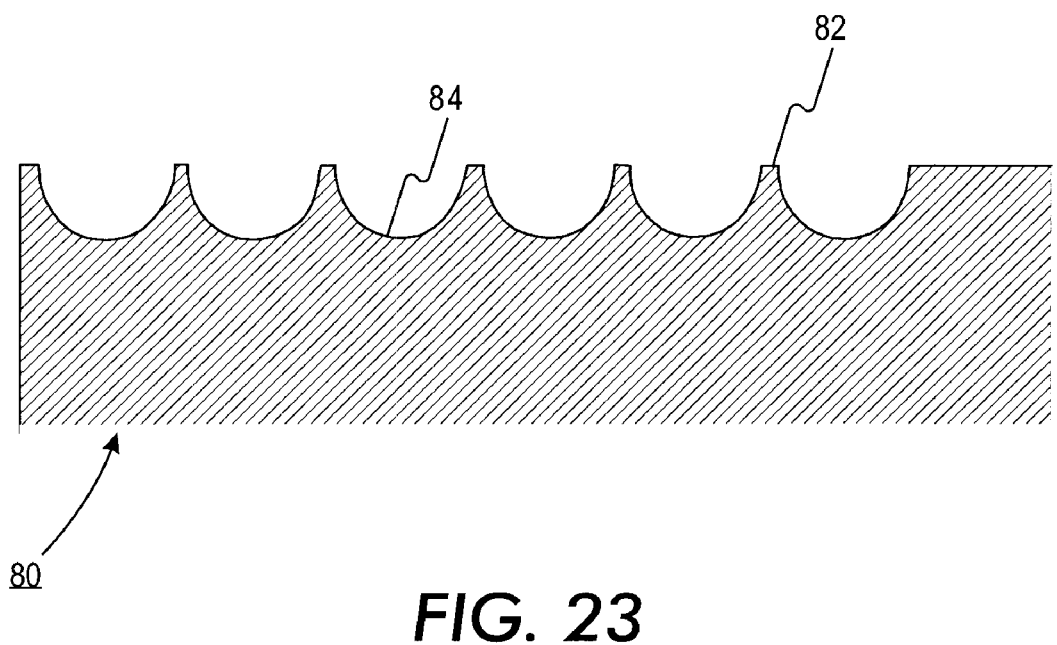
FIG. 23 depicts a cross section view of the exemplary carrier of FIG. 22.

The carriers are fabricated so as to maintain the rotatable-element components they are carrying in preferred positions. Exemplary first carrier 80 is depicted in FIGS. 22 and 23. FIG. 22 depicts a perspective view of first carrier 80, and FIG. 23 depicts a cross-section view of first carrier 80. First carrier 80 is microstructured so as to contain a sequence of first microrecesses 84 and micropeaks 82. Although FIGS. 22 and 23 depict first microrecesses 84 as hemispherical in shape, and arranged in a hexagonal array, first microrecesses 84 can be any shape, and can be arranged in any configuration, including a completely unordered array. In addition, although FIGS. 22 and 23 depict a collection of first microrecesses 84 that are uniform in shape, a first carrier 80 with many first microrecesses 84, all with different characteristic depths and widths, is also consistent with the present invention. First microrecesses 84 may be approximately of the order of 10 to 100 microns in diameter—not necessarily the same depth as width, and not necessarily equal to the size of the rotatable-element components as described above. Materials suitable as first carrier 80 material include glass, silicon, aluminum, polymethyl-methacrylate, polycarbonate, and like materials.

First microrecesses 84 can be formed using either silicon etch technology or RISTON film (available from E. I. du Pont de Nemours and Co., Wilmington, Del.). RISTON is a negative photoresist in the form of a polymer sheet and can be made to adhere to first carrier 80 material under conditions of heat and pressure. When exposed to ultraviolet light, the RISTON film photohardens such that when subsequently placed in a high-pH aqueous development solution, only the unexposed portions are dissolved. Thus, RISTON can be etched to form first microrecesses 84 and micropeaks 82 of first carrier 80. RISTON film is typically 2 mils thick; therefore, the depth of first microrecesses 84 can be fabricated with a precision of the order of 2 mils, where the desired depth can be achieved by applying multiple RISTON layers.

First microrecesses 84 can also be fabricated on first carrier 80 using laser ablation, as, for example, $CO_2$ laser ablation, to machine first microrecesses 84 to the desired depth, width and array. First microrecesses 84 can also be fabricated on first carrier 80 by embossing or injection molding.

In FIGS. 22 and 23, micropeaks 82 are depicted as forming a plane. However, it will be appreciated by one skilled in the art that micropeaks 82 may not determine a plane, and may determine a surface with arbitrary curvature at all points.

V.B.3. Distribution of Rotatable-element Components

Rotatable-element components may be distributed into first microrecesses 84 of first carrier 80 in any number of ways. For example, one preferred manner of distribution of rotatable-element components is depicted in FIGS. 24 and 25. FIG. 24 depicts a perspective view and FIG. 25 depicts a cross-section view of such manner of distribution consistent with the present invention. First rotatable-element components 92 are allowed to position into first microrecesses 84 of first carrier 80 by, for example, agitation. Doctor blade 90 is used to remove excess first rotatable-element components 92, where doctor blade 90 rides over the portion of first rotatable-element components 92 that may extend beyond micropeaks 82. Other preferred means of distribution consistent with the present invention include dispersing a slurry containing solid first rotatable-element components 92 within a liquid mixture. The surface tension of the liquid will hold in place the first rotatable-element components 92 that have positioned themselves into first microrecesses 84. The liquid portion of the slurry can be evaporated off, or removed in some other manner. Excess first rotatable-element components 92 can then be removed using doctor blade 90, or by some other means. In addition, first carrier 80 can be further agitated to assist in the removal of excess first rotatable-element components 92 from micropeaks 82.

One skilled in the art will appreciate that although FIG. 25 depicts rotatable-element components 92 as extending curved surfaces beyond micropeaks 82, rotatable-element components 92 may have a surface that is flush with micropeaks 82 and flat, or rotatable-element components 92 may have a surface of arbitrary shape extending beyond or within micropeaks 82.

Another preferred means of distribution includes the electrical charging of first rotatable-element components 92. First rotatable-element components 92 may be charged as a by-product of manufacture, or after the fact through the use of a corona-charging device. Thus, when first rotatable-element components 92 are proximal to first microrecesses 84, the image charge in first carrier 80 associated with the charge on first rotatable-element components 92 attracts the charged first rotatable-element components 92 so that they remain in first microrecesses 84.

Finally, first rotatable-element component material 94 may be dispersed as a liquid or melt as depicted in FIGS. 26 and 27 where, again, doctor blade 90 removes excess rotatable-element component material 94. FIG. 26 depicts a perspective view and FIG. 27 depicts a cross-section view of such manner of distribution consistent with the present invention. In such a case, first microrecesses 84 can be made wettable and micropeaks 82 nonwettable, consistent with the present invention. Excess rotatable-element component material 94 may also be removed from micropeaks 82 by blotting.

In the case where a liquid or melt is applied to first carrier 80, it may be appropriate to harden first rotatable-element components 92 prior to the formation of a composite rotatable-element component. The liquid or melt within first microrecesses 84 can be hardened through the use of cooling, curing, ultraviolet light, infrared light, irradiation, or other means.

V.C. Rotatable Assembly System and Method 1

Figure 28:
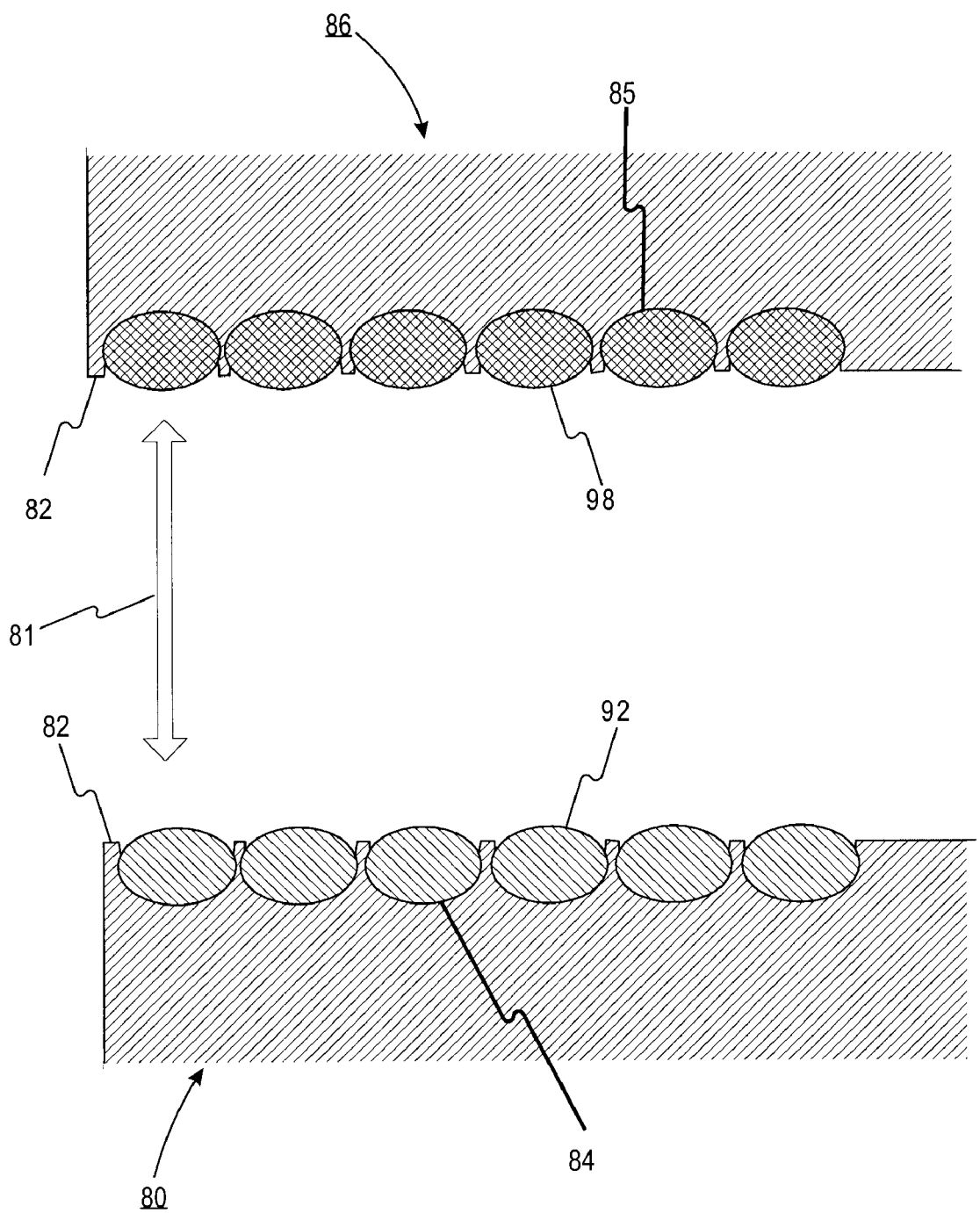
FIG. 28 depicts a cross section view of both a first carrier and a second carrier such that the microrecesses, and hence the rotatable-element components are aligned with respect to each other consistent with the present invention.

As described above and depicted in FIG. 28, first rotatable-element components 92 of a first class are distributed into first microrecesses 84 of first carrier 80. In a preferred embodiment of the present invention, second rotatable-element components 98 of a second class are distributed into second microrecesses 85 of second carrier 86. Following the distribution of first rotatable-element components 92 and second rotatable-element components 98, first rotatable-element components 92 and second rotatable-element components 98 can be brought together by the alignment of first microrecesses 84 of first carrier 80 with second microrecesses 85 of second carrier 86 as depicted in FIG. 28 by alignment arrow 81. This alignment can be achieved through the use of a conventional contact-mask-alignment system.

One of skill in the art will appreciate that, although FIG. 28 depicts first microrecesses 84 and second microrecesses 85 as symmetric about a small planar region determined by adjacent micropeaks 82, first microrecesses 84 and second microrecesses 85 can be any shape and may not necessarily be symmetric with respect to each other. For example, second microrecesses 85 may be flattened with respect to first microrecesses 84 such that second rotatable-element components 98 contains less volume in comparison to first rotatable-element components 92.

Figure 29:
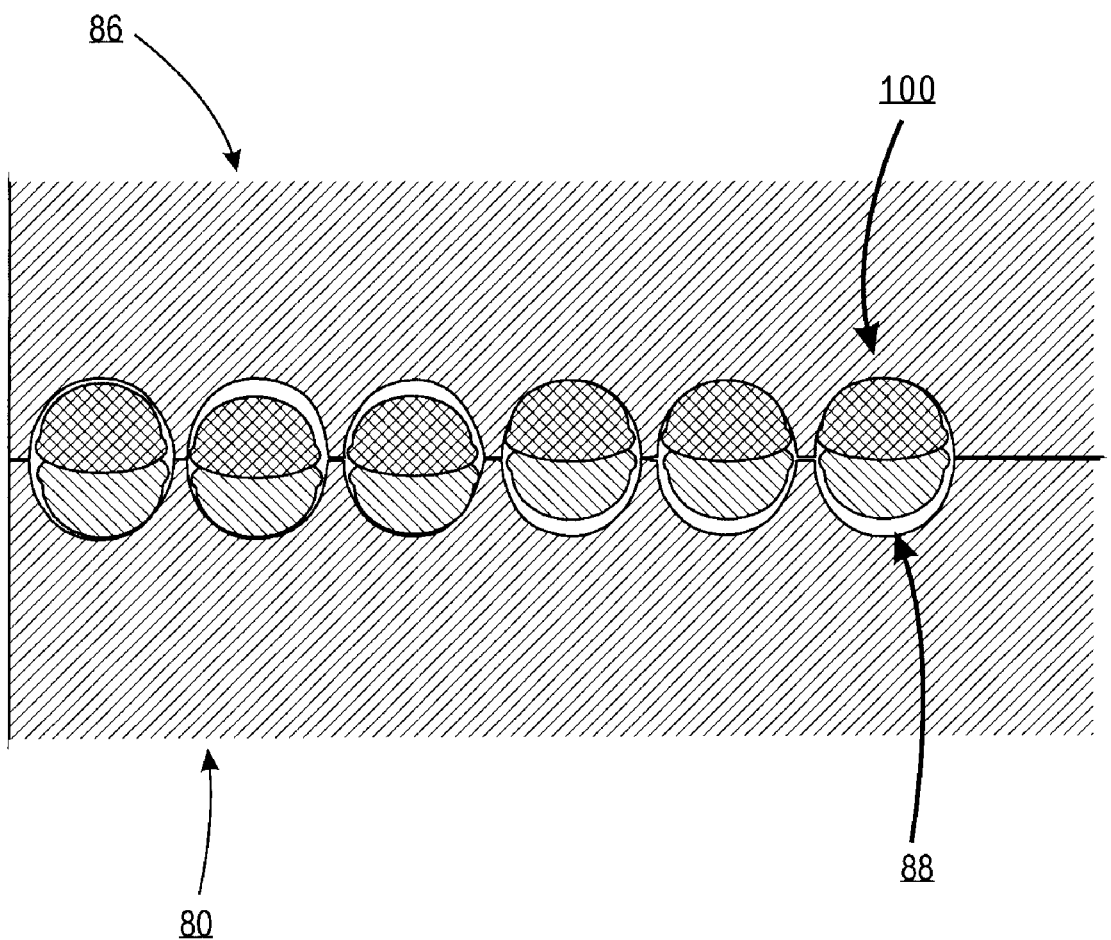
FIG. 29 depicts a cross section view of the first and second carriers of FIG. 28, where the first and second carriers have been coupled, and pressure and temperature either individually or together, are used to join rotatable-element components of a first class with those of a second class consistent with the present invention.

In FIG. 29, the microstructured surfaces of first carrier 80 and second carrier 86 are brought together to form region 88. The temperature of first rotatable-element components 92 and second rotatable-element components 98 are then changed in order to alter their structure at the interfacial boundary. For example, first carrier 80 and second carrier 86 may be heated slightly in order to thermally bond. Furthermore, when first carrier 80 and second carrier 86 are brought together as depicted in FIG. 29, a bonding pressure can be applied at the surface between first rotatable-element components 92 and second rotatable-element components 98. Composite rotatable-element components 100 are also depicted in FIG. 29. The temperature of first carrier 80 and second carrier 86 can be changed again in order to complete the bond between first rotatable-element components 92 and second rotatable-element components 98, as for example, through cooling. Following the formation of the bond, composite rotatable-element components 100 are removed from whichever carrier of first carrier 80 or second carrier 86, that composite rotatable-element components 100 remain in after the microstructured surfaces are separated. The removal of composite rotatable-element components 100 can be accomplished through the use of flexure of first carrier 80 or second carrier 86. Another mechanical means for removal includes the use of gas pressure applied from within first microrecesses 84 or second microrecesses 85 to expel composite rotatable-element components 100. A small nozzle (not shown), for example, may be situated within first microrecesses 84 or second microrecesses 85 that can expel gas, and thus expel composite rotatable-element components 100. The removal of composite rotatable-element components 100 may also be accomplished through the use of chemical releasing agents. Examples of chemical releasing agents are well-known in the art and depend on the materials used as first rotatable-element components 92 and second rotatable-element components 98.

Note that although FIG. 29 depicts the precise alignment of micropeaks 82 and a region 88 that is closed, one skilled in the art will appreciate that neither such a precise alignment nor such a closed region 88 is necessary to create a bond between first rotatable-element components 92 and second rotatable-element components 98 consistent with the present invention. That is, an alignment of micropeaks 82 that is slightly off-center, but that still allows for the exposure of surfaces of first rotatable-element components 92 with surfaces of second rotatable-element components 98 is also consistent with the present invention.

It will be appreciated by one skilled in the art that the sequence of pressure and heating described above with regard to FIG. 29 may be reversed. It will also be appreciated by one skilled in the art that the pressure and heating described above with regard to FIG. 29 may occur simultaneously consistent with the present invention.

In addition, or alternatively, if a liquid or melt of first rotatable-element component material 94 is applied to first microrecesses 84 of first carrier 80, as in FIGS. 26 and 27, and a corresponding liquid or melt of second rotatable-element component material (not shown) is applied to second microrecesses 85 of second carrier 86, then first carrier 80 and second carrier 86 may be brought together and the mixture of first rotatable-element component material 94 and second rotatable-element component material may be cured, irradiated, cooled, or hardened in some other manner to form composite rotatable-element components 100 consistent with the present invention. For example, first rotatable-element component material 94 and second rotatable-element component material may be cured using a chemical reaction initiated by mutual contact, ultraviolet light, infrared light, or irradiation.

Figure 30:
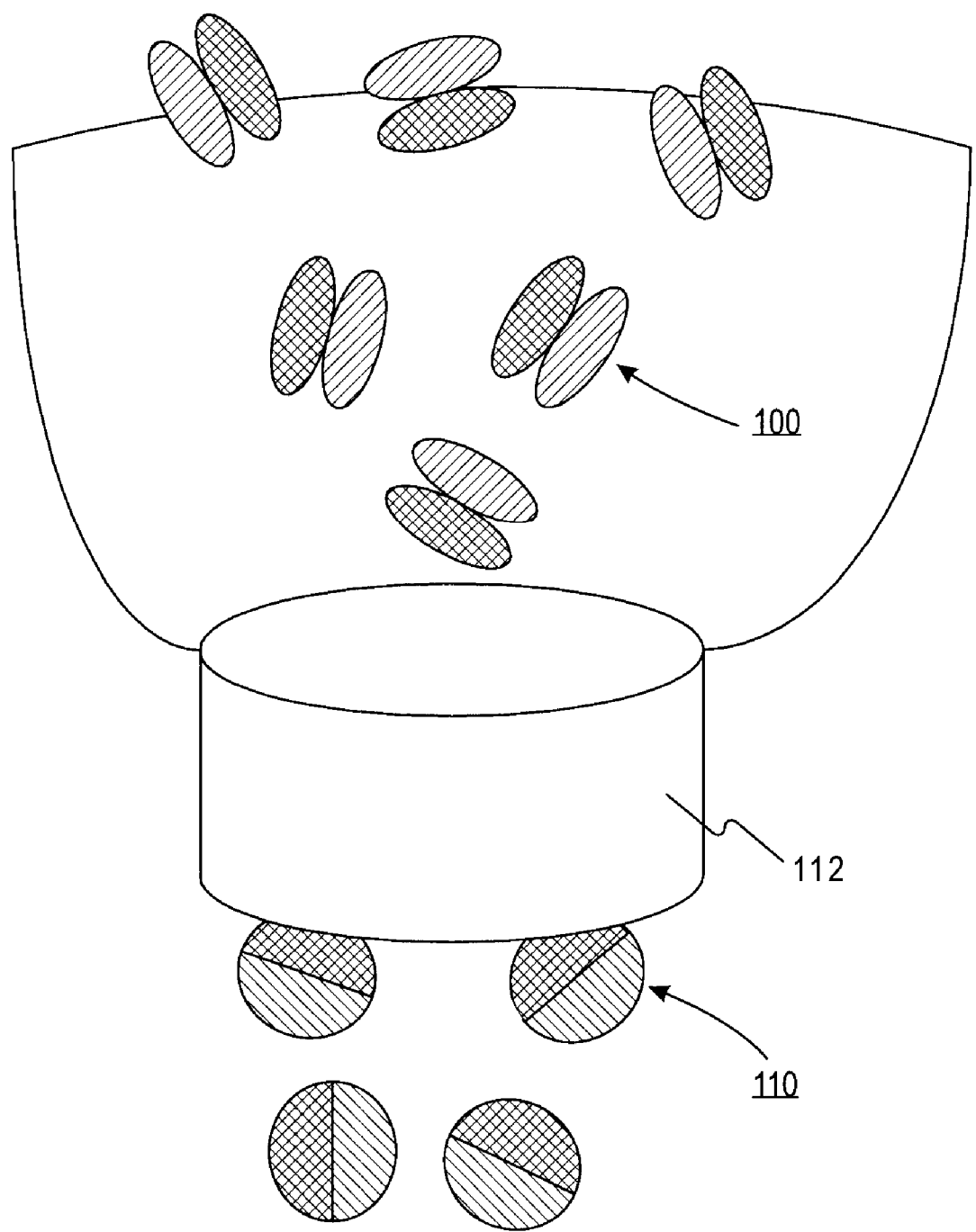
FIG. 30 depicts the passage of composite rotatable-element components through a device for reducing surface area or for reducing the moment of inertia of composite rotatable-element components consistent with the present invention.

Finally, composite rotatable-element components 100 can be passed through heating tower 112, or other device, in order to fix a thermal bond between rotatable-element components, reduce the surface area of composite rotatable-element components 100, or reduce the moment of inertia of composite rotatable-element components 100 about some axis, as depicted in FIG. 30. For example, if first microrecesses 84 and second microrecesses 85 are irregular in shape, or if first microrecesses 84 and second microrecesses 85 do not form the final desired composite rotatable-element components, then the resulting composite rotatable-element components 100 can be passed through heating tower 112 in order to produce modified composite rotatable-element components 110 with the desired properties.

Figure 31:
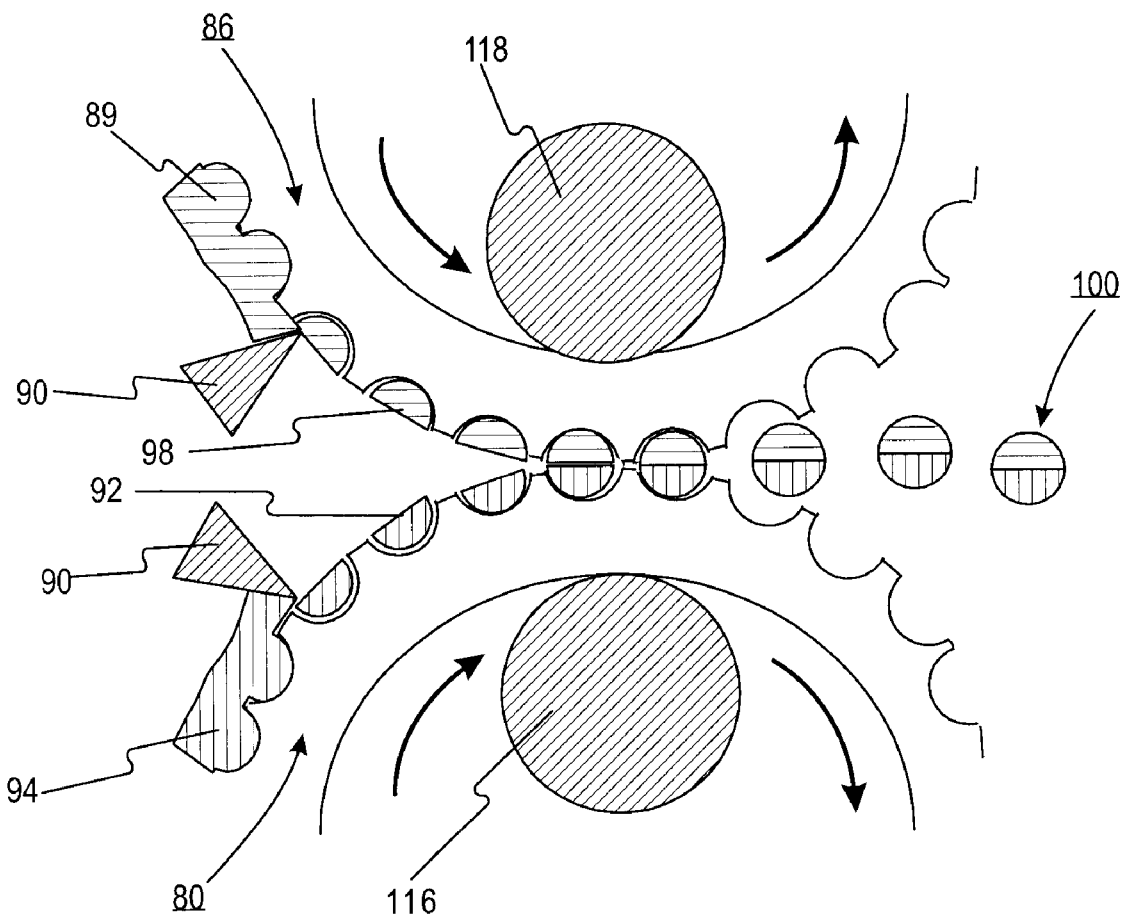
FIG. 31 depicts a cross section view of an exemplary system, consistent with the present invention, where the first and second carriers have been coupled, and pressure and temperature either individually or together, are used to join rotatable-element components of a first class with those of a second class.

FIG. 31 depicts a roll-roll system consistent with the present invention that lends itself readily to a continuous formation process. In the exemplary system depicted in FIG. 31, first carrier 80 and second carrier 86 are filled at the left with first rotatable-element component material 94 and second rotatable-element component material 89, respectively. Pressure and temperature together are altered as first carrier 80 and second carrier 86 pass between first roller 116 and second roller 118. First rotatable-element component 92 and second rotatable-element component 98 bond to form composite rotatable-element component 100, and are then released through flexure or other means at the right.

V.D. Rotatable Assembly System and Method 2

Figure 32:
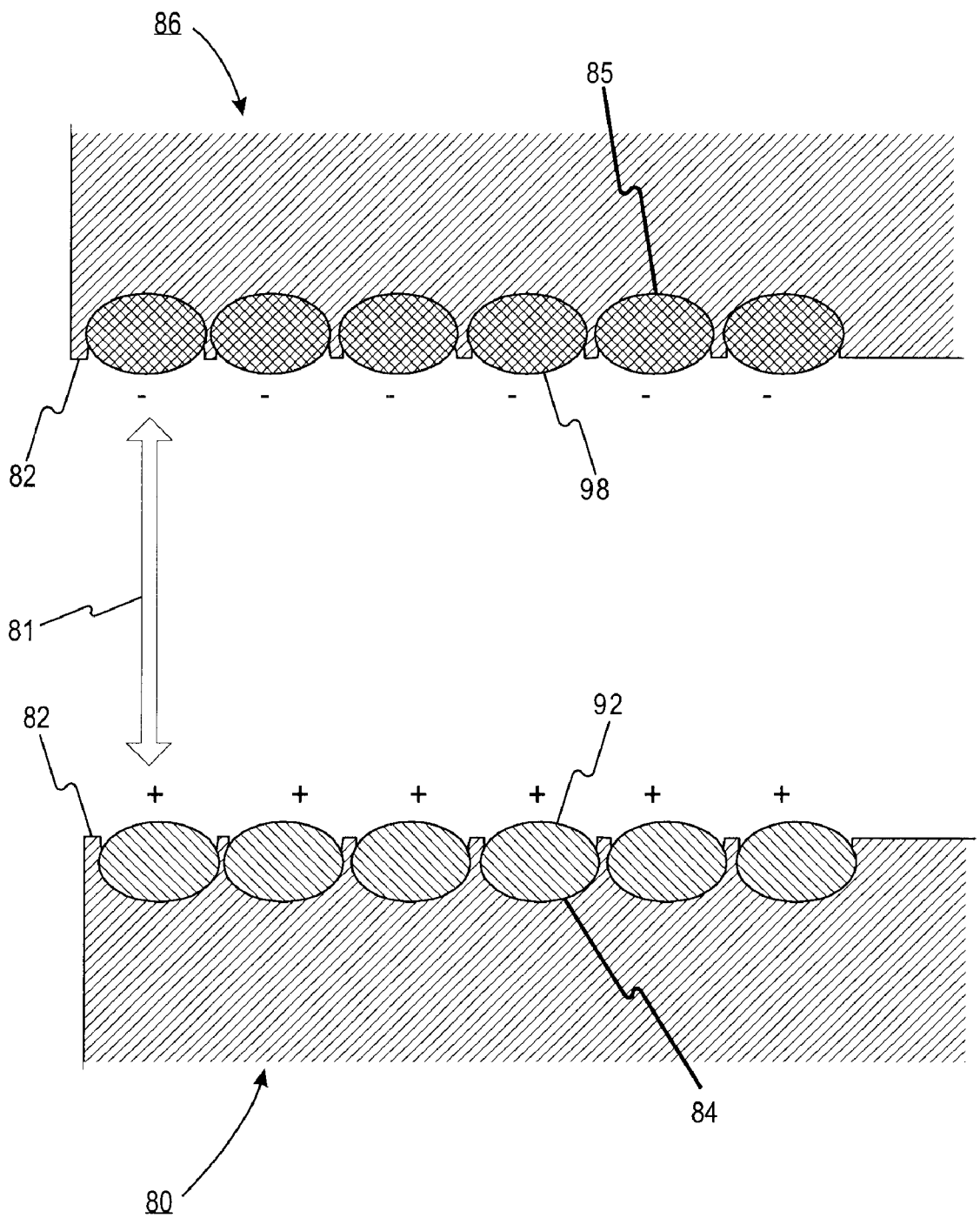
FIG. 32 depicts a cross section view of the first and second carriers of FIG. 28, where the respective rotatable-element components have been treated so as to self-assemble consistent with the present invention.

In another embodiment of the present invention, second carrier 86 with second rotatable-element components 98 is shown in FIG. 28 aligned across from first carrier 80. Following the distribution of first rotatable-element components 92 and second rotatable-element components 98, first rotatable-element components 92 and second rotatable-element components 98 are treated so as to allow for self-assembly. This is depicted in FIG. 32, where first rotatable-element components 92 from first carrier 80 are given an excess positive charge. Also shown are second rotatable-element components 98 from second carrier 86 that are likewise given an excess negative charge. Examples of materials having an excess of charge include electrets formed by charge injection.

Figure 33:
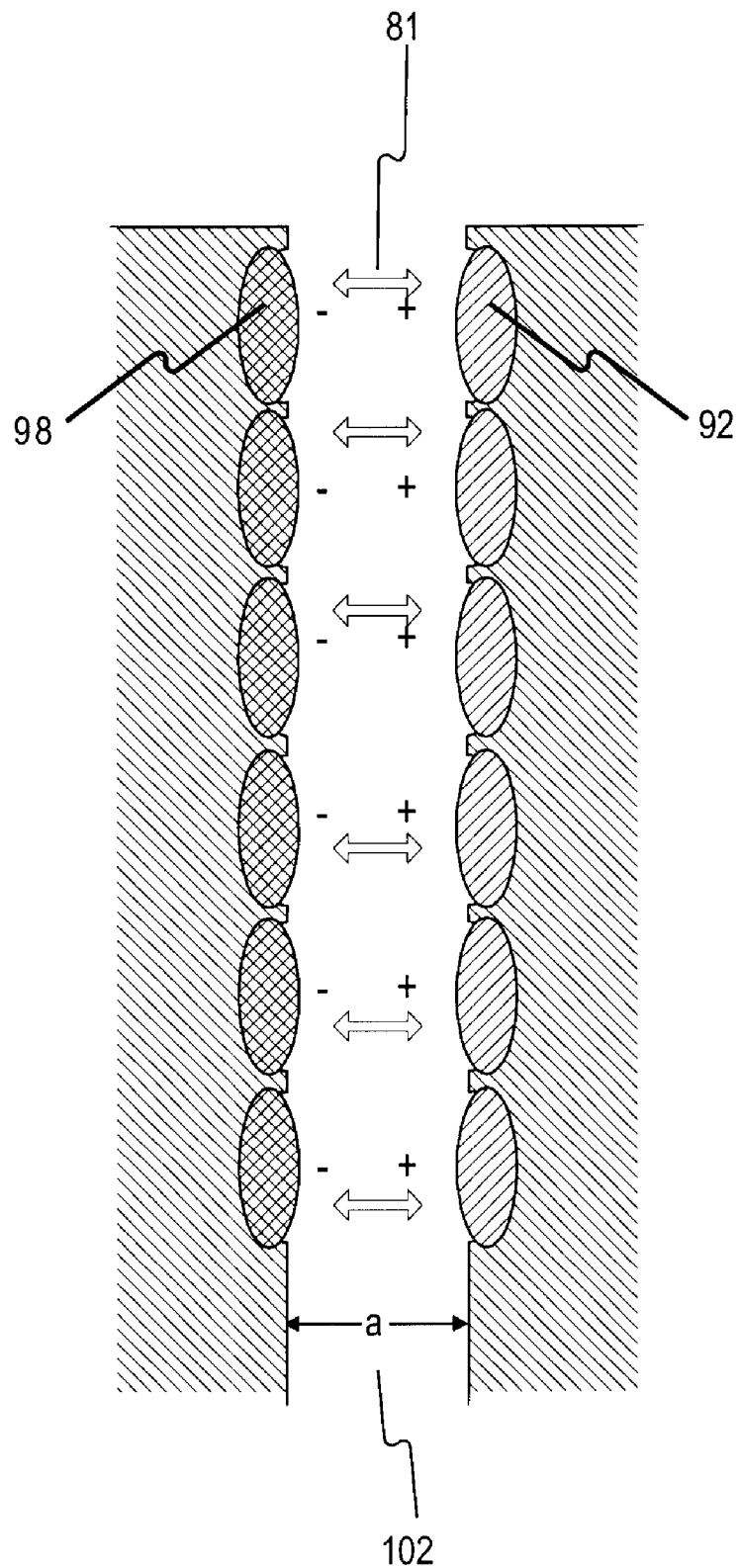
FIG. 33 depicts an alignment during a process of self-assembly consistent with the present invention.
Figure 34:
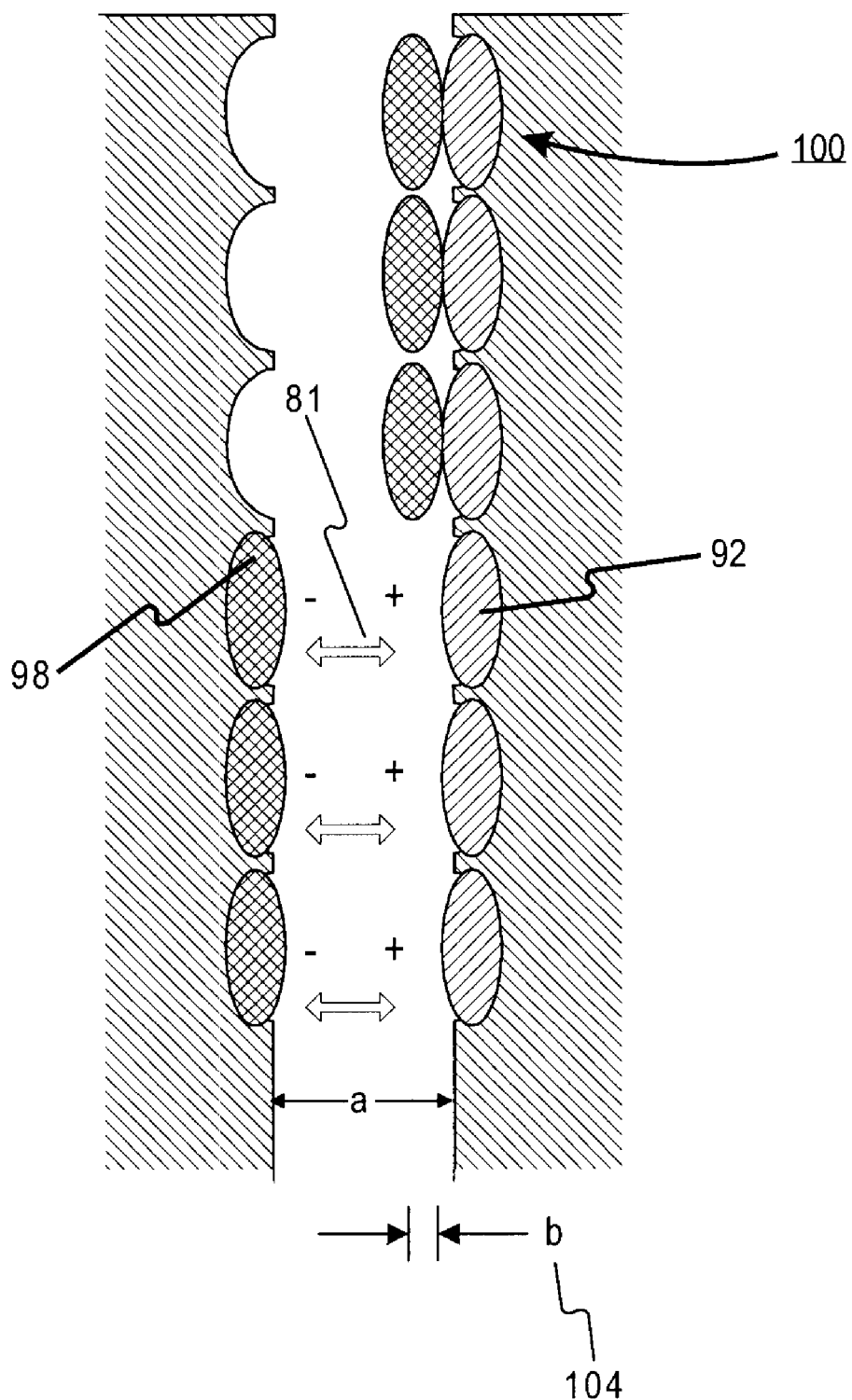
FIG. 34 depicts a bonding of rotatable-element components during a process of self-assembly consistent with the present invention.
Figure 35:
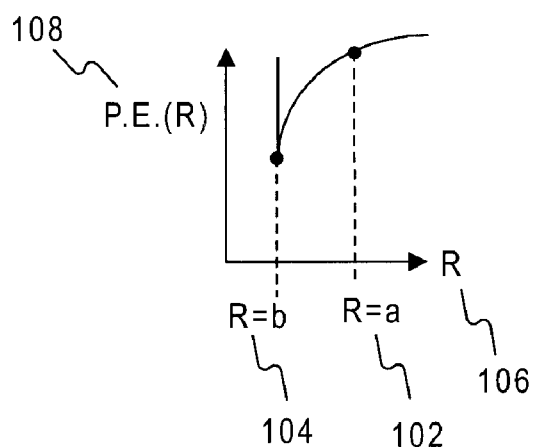
FIG. 35 depicts an exemplary potential energy diagram of the potential energy of interest of FIGS. 33 and 34, consistent with the present invention.

Next, in a preferred embodiment of the present invention, first rotatable-element components 92 and second rotatable-element components 98 can be brought together by the alignment of first microrecesses 84 and second microrecesses 85. This is depicted in FIGS. 33 and 34. The alignment, indicated by alignment arrow 81, can be accomplished through the use of a conventional contact-mask-alignment system. FIG. 35 depicts an exemplary potential energy curve displaying the potential energy of interest 108 associated with the self-assembly force as a function of separation distance R 106. The primary feature of potential energy of interest 108 as associated with an attractive force is the appearance of a minimum on the potential energy curve as a function of separation distance R 106 and associated with the contact of first rotatable-element components 92 with second rotatable-element components 98 at position R=b 104 shown in FIG. 34. Thus, when second rotatable-element components 98 are brought near first rotatable-element components 92 at R=a 102, depicted in FIG. 33, first rotatable-element components 82 and second rotatable-element components 98 are disposed towards positioning themselves at the minimum in the curve R=b 104 of the potential energy of interest 108. The minimum in the curve R=b 104 corresponds to the bonding that forms composite rotatable-element component 100 depicted in FIG. 34.

Following the formation of the bond, composite rotatable-element components 100 are removed through the use of flexure of first carrier 80 or second carrier 86. Another mechanical means for removal of composite rotatable-element components 100 described above includes the use of gas pressure applied from within first microrecesses 84 or second microrecesses 85 to expel composite rotatable-element components 100. A small nozzle (not shown), for example, may be situated within the first microrecesses 84 or second microrecesses 85 that can expel gas, and thus expel composite rotatable-element components 100. The removal of composite rotatable-element components 100 may also be accomplished through the use of chemical releasing agents as described above.

Figure 36:
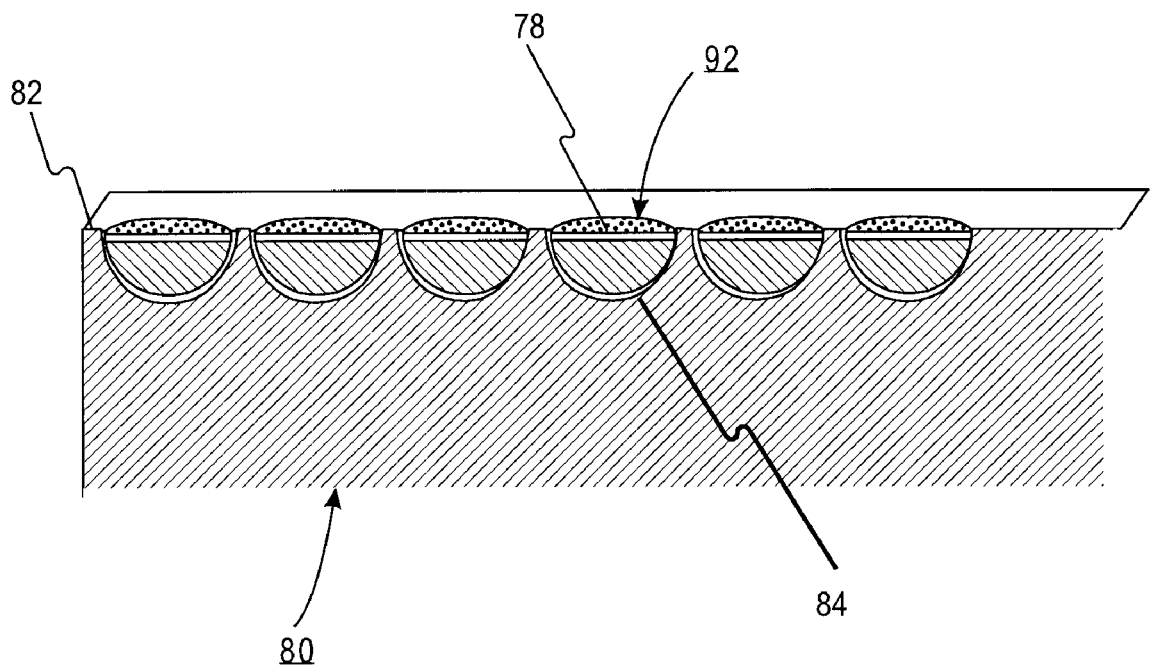
FIG. 36 depicts a cross-section view of rotatable-element components treated to contain an adhesion-promoting layer.

To promote adhesion and/or self-assembly, one or both free surfaces of first rotatable-element components 92 and second rotatable-element components 98 can be given adhesion-promoting layer 78, as, for example, by evaporative deposition. This is depicted in FIG. 36. In a preferred embodiment of the present invention, adhesion-promoting layer 78 may comprise, in part, an electric dipole, as an electret, or a magnetic dipole. For example, first rotatable-element components 92 may have a flat surface and a curved, generally hemispherical surface. Likewise, second rotatable-element components 98 (not shown) may have a flat surface and a curved, generally spherical surface. In this example, the preferred bonding configuration is for the flat side of first rotatable-element components 92 to bond to the flat sides of second rotatable-element components 98. Accordingly, adhesion-promoting layer 78 is created on the flat sides only. This can be accomplished through the process of charge injection, as from a plasma source, where charges are directed to the flat sides of first rotatable-element components 92, and come to rest at or near the surface. One skilled in the art will appreciate, however, that adhesion-promoting layer 78 described above can contain charges or aligned dipoles. This leads advantageously to stronger alignment and self-assembly of pairs of rotatable-element components as well as minimizing clustering of rotatable-element components. The sorting of the preferentially-bound from the weakly-bound configurations can be accomplished using sieve 114 as depicted in FIG. 37.

Figure 37:
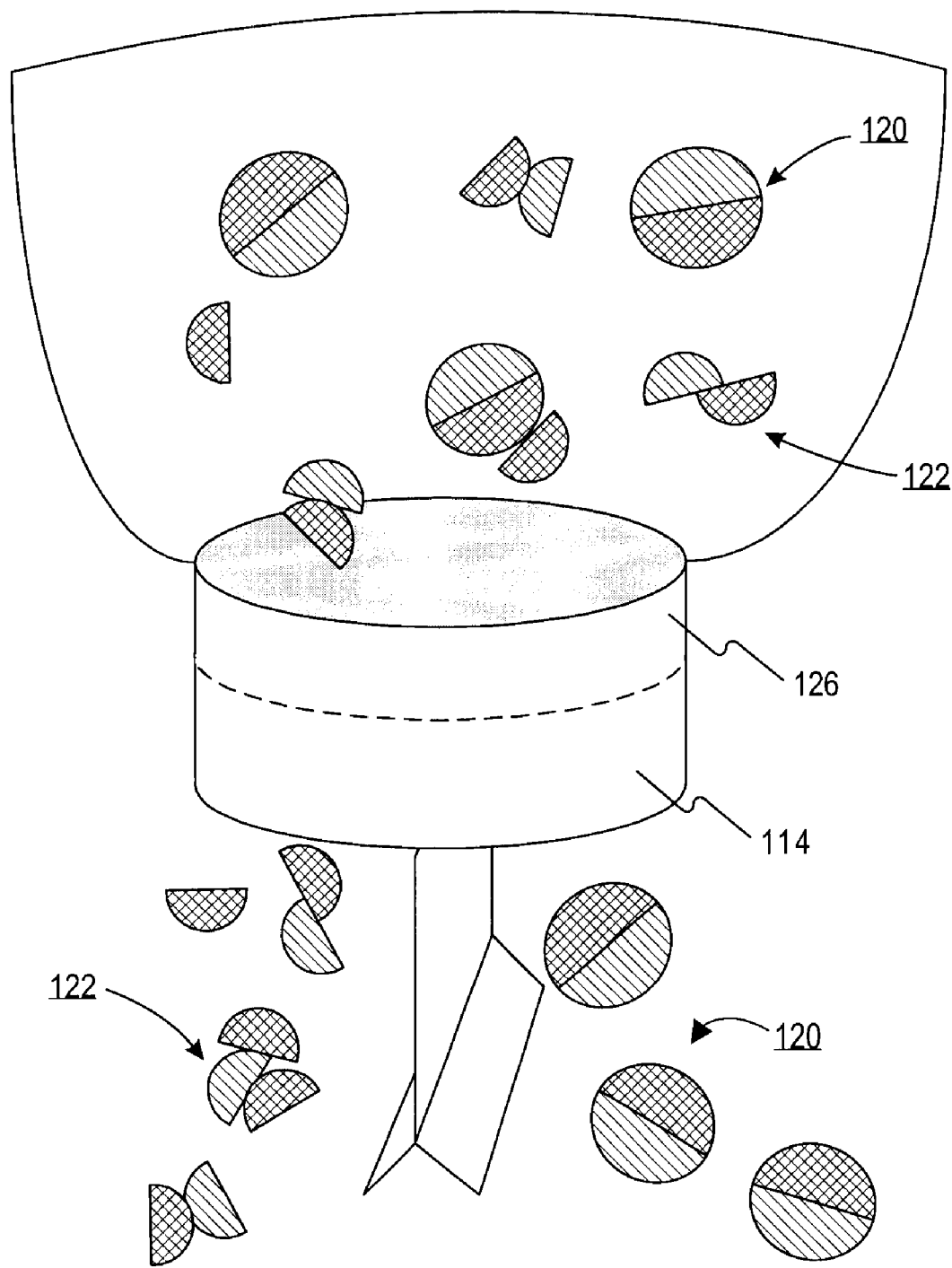
FIG. 37 depicts the passage of composite rotatable-element components through a sieve as well as an optional mixing chamber, where the sieve separates well-formed composite rotatable-element components from non-well-formed composite rotatable-element components consistent with the present invention.

In FIG. 37, a mixture of well-formed composite rotatable-element components 120 and non-well-formed composite rotatable-element components 122 are directed into sieve 114, which may include optional mixing chamber 126. Sieve 114 sorts well-formed composite rotatable-element components 120 from non-well-formed composite rotatable-element components 122 as depicted at the bottom of FIG. 37. The means of sorting may include shape, size, mass, electric charge, or magnetic charge. For example, the characteristic path of electric charges in a known magnetic field can assist in the sorting of well-formed composite rotatable-element components 120 from non-well-formed composite rotatable-element components 122 where there is a preferred electric charge structure. Furthermore, the centrifugal force associated with well-formed composite rotatable-element components 120 of a preferred mass can be used to sort well-formed composite rotatable-element components 120 from non-well-formed composite rotatable-element components 122.

Following passage through sieve 114, well-formed composite rotatable-element components 120 may be passed through heating tower 112 as described above and as depicted in FIG. 30. An added advantage of this method in this embodiment is that modified composite rotatable-element components 110 may acquire, in the process, a fixed dipole moment, useful for subsequent manipulation by an external field.

Finally, the self-assembly force can also be a force of chemical adhesion and chemical repulsion associated with a chemical treatment of second rotatable-element components 98 and first rotatable-element components 92. An example of such a chemical interaction includes the interaction between hydrogen-terminated surfaces and hydroxyl-terminated surfaces. In this embodiment, bonding occurs at elevated temperatures by water displacement reactions only between complimentary surfaces. This is similar to oligonucleotides where, for example, "A" (adenine) bonds to "T" (thymine), but not to "A."

Again, the sorting of the preferentially-bound from the weakly-bound configurations can be accomplished using sieve 114 as depicted in FIG. 37. And again, well-formed composite rotatable-element components 120 bound in such a manner can be passed through heating tower 112 as described above and as depicted in FIG. 30.

It will be appreciated by one of skill in the art that the treatment of first rotatable-element components 92 and second rotatable-element components 98 that gives rise to the self-assembly force can occur prior to the distribution of first rotatable-element components 92 and second rotatable-element components 98 into first microrecesses 84 and second microrecesses 85, respectively, of first carrier 80 and second carrier 86. For example, if first rotatable-element components 92 are electrically charged as a by-product of manufacture, or electrically charged after the fact by a corona charging device as described above as one embodiment of a distribution means, then the same electrostatic charge can give rise to the self-assembly force. In such an embodiment of the present invention, first rotatable-element components 92 have been treated prior to distribution into first microrecesses 84 of first carrier 80.

V.E. Rotatable Assembly System and Method 3

In another embodiment of the present invention, first rotatable-element components 92 and second rotatable-element components 98 are treated as shown in FIG. 32 to allow for self assembly. Rather than aligning first microrecesses 84 and second microrecesses 85, however, first rotatable-element components 92 and second rotatable-element components 98 are expelled from first carrier 80 and second carrier 86 into mixing chamber 126 and allowed to self-assemble. First rotatable-element components 92 and second rotatable-element components 98 may be expelled from first microrecesses 84 and second microrecesses 85 using flexure or some other means. For example, gas pressure can be used to expel first rotatable-element components 92 and second rotatable-element components 98. A small nozzle (not shown), for example, may be situated within first microrecesses 84 or second microrecesses 85 that can expel gas, and thus expel first rotatable-element components 92 or second rotatable-element components 98. The removal of first rotatable-element components 92 and second rotatable-element components 98 may also be assisted through the use of chemical releasing agents as described above.

In a preferred embodiment, first rotatable-element components 92 and second rotatable-element components 98 can then be agitated in mixing chamber 126, then directed into sieve 114, as indicated in FIG. 37, to sort well-formed composite rotatable-element components 120 from non-well-formed composite rotatable-element components 122. Once again, well-formed composite rotatable-element components 120 may be directed through heating tower 112, as depicted in FIG. 30 in order to fix the bond, reduce the surface area, or reduce the moment of inertia about some axis of well-formed composite rotatable-element components 120.

V.F. Rotatable Assembly System and Method 4

In another embodiment of the present invention, first rotatable-element components 92 and second rotatable-element components 98 are treated to allow for self-assembly without the use of first carrier 80 or second carrier 86. For example, as mentioned above, first rotatable-element components 92 and second rotatable-element components 98 may be electrically charged as a by-product of manufacture, or electrically charged after the fact by a corona charging device. Thus, in this embodiment of the invention, first rotatable-element components 92 and second rotatable-element components 98 are dispersed into mixing chamber 126 and allowed to self-assemble. First rotatable-element components 92 and second rotatable-element components 98 can then be agitated in mixing chamber 126 and then directed into sieve 114, as indicated in FIG. 37, to sort well-formed composite rotatable-element components 120 from non-well-formed composite rotatable-element components 122. Once again, well-formed composite rotatable-element components 120 may be directed through heating tower 112, as depicted in FIG. 30 in order to fix the bond, reduce the surface area, or reduce the moment of inertia about some axis of well-formed composite rotatable-element components 120.

V.G. Laminate Substrate System and Method

Figure 38:
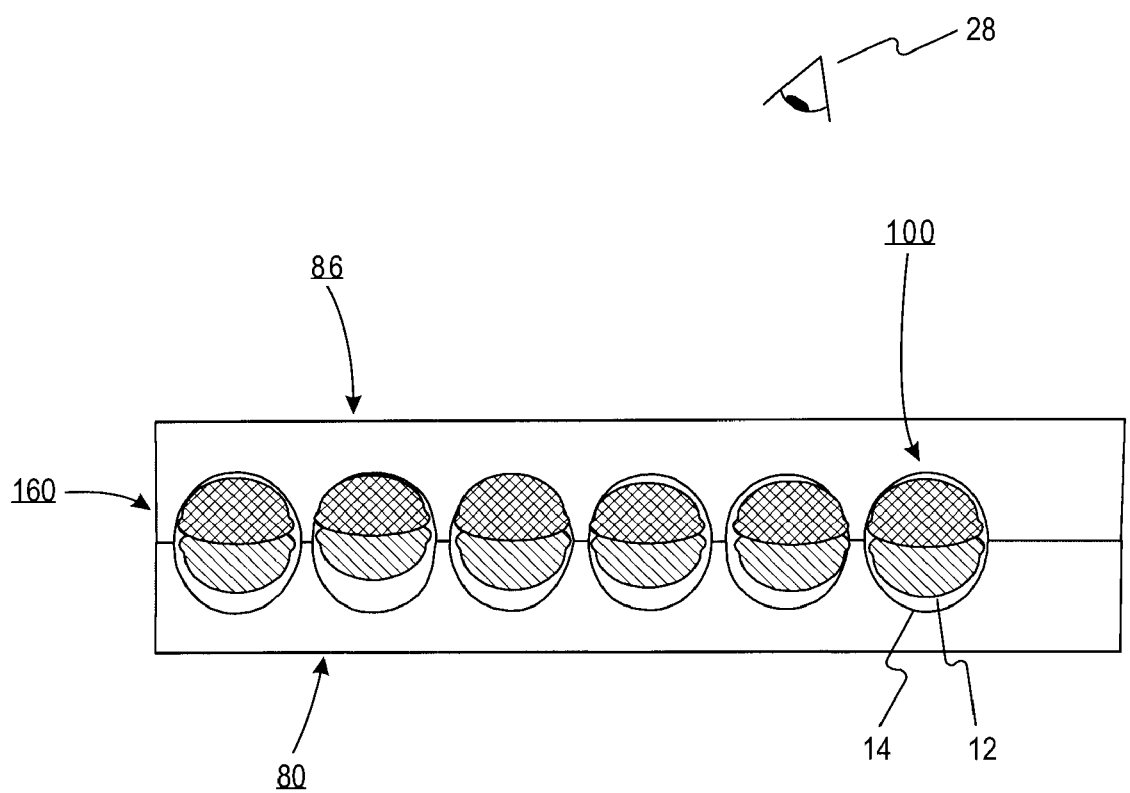
FIG. 38 depicts the union of two carriers into a laminate substrate such that the respective rotatable-element components form a composite rotatable-element component, and such that the microstructured surfaces form a containment structure consistent with the present invention.

In another embodiment of the present invention, systems and methods generate a laminate substrate having cavities in which are contained composite rotatable-element components for use in rotating element sheet material. An exemplary laminate substrate 160 is depicted in FIG. 38.

In an embodiment of the present invention for creating laminate substrate 160, first carrier 80 and second carrier 86 are substrate components. For example, first carrier 80 may be colored white, and second carrier 86 may be transparent. In a preferred embodiment, first carrier 80 and second carrier 86 are brought adjacent to each other and bonded such that first microrecesses 84 and second microrecesses 85 form cavities 14 for composite rotatable-element components 100 as shown in FIG. 38. Thus laminate substrate 160 provides rotating element sheet material with a dense monolayer of composite rotatable-element components 100. Enabling fluid 12 is then introduced in order to swell cavities 14 and allow for the free rotation of composite rotatable-element components 100.

One skilled in the art will appreciate that cavities are not the only containment structure within substrate 16 for composite rotatable-element component 100. For example, any structure that allows composite rotatable-element component 100 to be in contact with enabling fluid 12 and that restricts at least one translational degree of freedom of composite rotatable-element component 100 is a suitable containment structure.

The microstructured surfaces of first carrier 80 and second carrier 86 can be aligned optically or mechanically by using, for example, micro-dowel holes created at the same time as embossing. A sprocket-like arrangement can facilitate a roll-roll fabrication process, as for example, was depicted in FIG. 31 in relation to composite rotatable-element component fabrication. In addition, the microstructured carrier surfaces can be bonded using a thin film adhesive layer or through thermo-compression bonding.

It will be appreciated by one of skill in the art that interstitial microrecesses of a smaller diameter may be introduced on first carrier 80 and second carrier 86 that allow for smaller composite rotatable-element components 100 and smaller, interstitial, cavities 14. Furthermore, even though FIG. 38 displays composite rotatable-element components 100 with two-valued aspects, composite rotatable-element components 100 can also have multivalued aspects, since first rotatable-element components 92 and second rotatable-element components 98 themselves may have multivalued aspects.

V.H. Conclusion

Methods and apparatus consistent with the present invention can be used to assemble composite rotatable-element components and can be used to form a laminate substrate system. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, FIGS. 22 and 23 depict hemispherical microrecesses arranged in a hexagonal array. However, such microrecesses can be of any shape, and may be arranged in any type of array, including a completely unordered array. Furthermore, FIG. 28 depicts microrecesses 84 of carrier 80 as mirror images of microrecesses 85 of carrier 86. However, opposing microrecesses from opposing carriers need not be mirror images. The volume and shape and the microrecesses from one carrier can be very different from the volume and shape of the opposing microrecess from the opposing carrier. Furthermore, some of the examples used the spectrum associated with visible light as the electromagnetic energy of interest. However, the use of any electromagnetic energy, including infrared, ultraviolet and x-rays as the electromagnetic energy of interest is consistent with the present invention. Still further, FIGS. 29–31, 34, 37 and 38 depict composite rotatable-element components with two-valued aspects created from rotatable-element components with one-valued aspects. However, the rotatable-element components can have multivalued aspects themselves, and their union will form composite rotatable-element components with more than two-valued aspects. Accordingly, the invention is not limited to the above described embodiments, but instead is defined by the appended claims in light of their full scope of equivalents.

What is claimed is:

1. A method for assembling a composite rotatable-element component using a plurality of rotatable-element components of a first class and a plurality of rotatable-element components of a second class;

wherein said plurality of rotatable-element components of a first class are defined by a first common response or responses to incident electromagnetic radiation of interest, and wherein said plurality of rotatable-element components of a second class are defined by a second common response or responses to said incident electromagnetic radiation of interest;

said method comprising:

dispersing said plurality of rotatable-element components of a first class to first preferred positions on a first carrier, dispersing said plurality of rotatable-element components of a second class to second preferred positions on a second carrier, performing a first manipulation of said first carrier and said second carrier such that one of said plurality of rotatable-element components of a first class in said first preferred position and one of said plurality of rotatable-element components of a second class in said second preferred position touch at a contact point, and performing a second manipulation of said one of said plurality of rotatable-element components of a first class and said one of said plurality of rotatable-element components of a second class at said contact point such that said one of said plurality of rotatable-element components of a first class and said one of said plurality of rotatable-element components of a second class bond to form said composite rotatable-element component.

2. A method for assembling a composite rotatable-element component using rotatable-element component material of a first class and rotatable-element component material of a second class;

said method comprising:

dispersing said rotatable-element component material of a first class to first preferred positions on a first carrier to form a plurality of rotatable-element components of a first class in liquid or melt form, dispersing said rotatable-element component material of a second class to second preferred positions on a second carrier to form a plurality of rotatable-element components of a second class in liquid or melt form, performing a first manipulation of said first carrier and said second carrier such that one of said plurality of rotatable-element components of a first class in said first preferred position and one of said plurality of rotatable-element components of a second class in said second preferred position touch at a contact point, performing a second manipulation of said one of said plurality of rotatable-element components of a first class in liquid or melt form and said one of said plurality of rotatable-element components of a second class in liquid or melt form such that said one of said plurality of rotatable-element components of a first class in liquid or melt form hardens and said one of said plurality of rotatable-element components of a second class in liquid or melt form hardens, and performing a third manipulation of said one of said plurality of rotatable-element components of a first class and said one of said plurality of said rotatable-element components of a second class at said contact point such that said one of said plurality of rotatable-element components of a first class and said one of said plurality of rotatable-element components of a second class bond to form said composite rotatable-element component.

3. A method for assembling a composite rotatable-element component using rotatable-element component material of a first class and a plurality of rotatable-element components of a second class, said method comprising:

dispersing said rotatable-element component material of a first class to first preferred positions on a first carrier to form a plurality of rotatable-element components of a first class in liquid or melt form, dispersing said plurality of rotatable-element components of a second class to second preferred positions on a second carrier, performing a first manipulation of said first carrier and said second carrier such that one of said plurality of rotatable-element components of a first class in said first preferred position and one of said plurality of rotatable-element components of a second class in said second preferred position touch at a contact point, performing a second manipulation of said one of said plurality of rotatable-element components of a first class in liquid or melt form such that said one of said plurality of rotatable-element components of a first class in liquid or melt form hardens, and performing a third manipulation of said one of said plurality of rotatable-element components of a first class and said one of said plurality of rotatable-element components of a second class at said contact point such that said one of said plurality of rotatable-element components of a first class and said one of said plurality of rotatable-element components of a second class bond to form said composite rotatable-element component, wherein said one of said plurality of rotatable-element components of a first class in said hardened form is characterized by a first response to incident electromagnetic radiation of interest and said one of said plurality of rotatable-element components of a second class is characterized by a second response to said incident electromagnetic radiation of interest.

4. The method of claim 2 wherein said second manipulation of said one of said plurality of rotatable-element components of a first class in liquid or melt form and said one of said plurality of rotatable element components of a second class in liquid or melt form comprises any of the processes of cooling, curing, exposure to ultraviolet light, exposure to infrared light, or irradiation.

5. The method of claim 3 wherein said second manipulation of said one of said plurality of rotatable-element components of a first class in liquid or melt form comprises
any of the processes of cooling, curing, exposure to ultraviolet light, exposure to infrared light, or irradiation.

6. The method of claim 1 wherein said second manipulation of said one of said plurality of rotatable-element components of a first class and said one of said plurality of rotatable-element components of a second class at said contact point comprises
altering the structure of the interfacial boundary between said one of said plurality of rotatable-element components of a first class and said one of said plurality of rotatable-element components of a second class at said contact point.

7. The method of claim 2, 3, 4, or 5 wherein said third manipulation of said one of said plurality of rotatable-element components of a first class and said one of said plurality of rotatable-element components of a second class at said contact point comprises
altering the structure of the interfacial boundary between said one of said plurality of rotatable-element components of a first class and said one of said plurality of rotatable-element components of a second class at said contact point.

8. The method of claim 1 wherein said second manipulation of said one of said plurality of rotatable-element components of a first class and said one of said plurality of rotatable-element components of a second class at said contact point comprises
altering the temperature of said one of said plurality of rotatable-element components of a first class and said one of said plurality of rotatable-element components of a second class at said contact point.

9. The method of claim 2, 3, 4, or 5 wherein said third manipulation of said one of said plurality of rotatable-element components of a first class and said one of said plurality of rotatable-element components of a second class at said contact point comprises
altering the temperature of said one of said plurality of rotatable-element components of a first class and said one of said plurality of rotatable-element components of a second class at said contact point.

10. The method of claim 1 wherein said second manipulation of said one of said plurality of rotatable-element components of a first class and said one of said plurality of rotatable-element components of a second class at said contact point comprises
altering the pressure between said one of said plurality of rotatable-element components of a first class and said one of said plurality of rotatable-element components of a second class at said contact point.

11. The method of claim 2, 3, 4, or 5 wherein said third manipulation of said one of said plurality of rotatable-element components of a first class and said one of said plurality of rotatable-element components of a second class at said contact point comprises
altering the pressure between said one of said plurality of rotatable-element components of a first class and said one of said plurality of rotatable-element components of a second class at said contact point.

12. The method of claim 1 wherein said second manipulation of said one of said plurality of rotatable-element components of a first class and said one of said plurality of rotatable-element components of a second class at said contact point comprises
altering the temperature and pressure of said one of said plurality of rotatable-element components of a first class and said one of said plurality of rotatable-element components of a second class at said contact point.

13. The method of claim 2, 3, 4, or 5 wherein said third manipulation of said one of said plurality of rotatable-element components of a first class and said one of said plurality of rotatable-element components of a second class at said contact point comprises
altering the temperature and pressure of said one of said plurality of rotatable-element components of a first class and said one of said plurality of rotatable-element components of a second class at said contact point.

14. A method for assembling a composite rotatable-element component using a plurality of rotatable-element components of a first class and a plurality of rotatable-element components of a second class,
wherein said plurality of rotatable-element components of a first class are defined by a first common response or responses to incident electromagnetic radiation of interest, and
wherein said plurality of rotatable-element components of a second class are defined by a second common response or responses to said incident electromagnetic radiation of interest,
said method comprising the steps of:
dispersing said plurality of rotatable-element components of a first class to first preferred positions on a first carrier;
dispersing said plurality of rotatable-element components of a second class to second preferred positions on a second carrier;
performing a first manipulation on one of said plurality of rotatable-element components of a first class and performing a second manipulation on one of said plurality of rotatable-element components of a second class such that the potential energy of interest of said one of said plurality of rotatable-element components of a first class and said one of said plurality of rotatable-element components of a second class is minimized when said one of said plurality of rotatable-element components of a first class and said one of said plurality of rotatable-element components of a second class touch at a contact point, and
performing a third manipulation of said first carrier and second carrier such that said one of said plurality of rotatable-element components of a first class and said one of said plurality of rotatable-element components of a second class touch at said contact point.

15. A method for assembling a composite rotatable-element component using rotatable-element component material of a first class and rotatable-element component material of a second class;
said method comprising:
dispersing said rotatable-element component material of a first class to first preferred positions on a first carrier to form a plurality of rotatable-element components of a first class in liquid or melt form,
dispersing said rotatable-element component material of a second class to second preferred positions on a second carrier to form a plurality of rotatable-element components of a second class in liquid or melt form, performing a first manipulation on one of said plurality of rotatable-element components of a first class and performing a second manipulation on one of said plurality of rotatable-element components of a second class such that a potential energy of interest of said one of said plurality of rotatable-element components of a first class and said one of said plurality of rotatable-element components of a second class is minimized when said one of said plurality of rotatable-element components of a first class and said one of said plurality of rotatable-element components of a second class touch at a contact point, performing a third manipulation of said first carrier and said second carrier such that one of said plurality of rotatable-element components of a first class in said first preferred position and one of said plurality of rotatable-element components of a second class in said second preferred position touch at said contact point, and performing a fourth manipulation of said one of said plurality of rotatable-element components of a first class in liquid or melt form and said one of said plurality of rotatable-element components of a second class in liquid or melt form such that said one of said plurality of rotatable-element components of a first class in liquid or melt form hardens and said one of said plurality of rotatable-element components of a second class in liquid or melt form hardens, wherein said potential energy of interest comprises potential energy associated with a self-assembly force between said one of said plurality of rotatable-element components of a first class and said one of said plurality of rotatable-element components of a second class.

16. A method for assembling a composite rotatable-element component using rotatable-element component material of a first class and a plurality of rotatable-element components of a second class, said method comprising:

dispersing said rotatable-element component material of a first class to first preferred positions on a first carrier to form a plurality of rotatable-element components of a first class in liquid or melt form, dispersing said plurality of rotatable-element components of a second class to second preferred positions on a second carrier, performing a first manipulation on one of said plurality of rotatable-element components of a first class and performing a second manipulation on one of said plurality of rotatable-element components of a second class such that a potential energy of interest of said one of said plurality of rotatable-element components of a first class and said one of said plurality of rotatable-element components of a second class is minimized when said one of said plurality of rotatable-element components of a first class and said one of said plurality of rotatable-element components of a second class touch at a contact point, performing a third manipulation of said one of said plurality of rotatable-element components of a first class in liquid or melt form such that said one of said plurality of rotatable-element components of a first class in liquid or melt form hardens, and performing a fourth manipulation of said first carrier and said second carrier such that one of said plurality of rotatable-element components of a first class in said first preferred position and one of said plurality of rotatable-element components of a second class in said second preferred position touch at said contact point, wherein said one of said plurality of rotatable-element components of a first class in said hardened form is characterized by a first response to incident electromagnetic radiation of interest and said one of said plurality of rotatable-element components of a second class is characterized by a second response to said incident electromagnetic radiation of interest, and wherein said potential energy of interest comprises potential energy associated with a self-assembly force between said one of said plurality of rotatable-element components of a first class and said one of said plurality of rotatable-element components of a second class.

17. The method of claim 15 or 16 wherein said first manipulation of said one of said plurality of rotatable-element components of a first class and said second manipulation of said one of said plurality of rotatable-element components of a second class comprises establishing an electrostatic polarity between said one of said plurality of rotatable-element components of a first class in said first preferred position on said first carrier and said one of said plurality of rotatable-element components of a second class in said second preferred position on said second carrier.

18. The method of claim 15 or 16 wherein said first manipulation of said one of said plurality of rotatable-element components of a first class and said second manipulation of said one of said plurality of rotatable-element components of a second class comprises establishing a first magnetic polarity on said one of said plurality of rotatable-element components of a first class in said first preferred position on said first carrier, and establishing a second magnetic polarity on said one of said plurality of rotatable-element components of a second class in said second preferred position on said second carrier.

19. The method of claim 15 or 16 wherein said first manipulation of said one of said plurality of rotatable-element components of a first class and said second manipulation of said one of said plurality of rotatable-element components of a second class comprises establishing a first electric polarity on said one of said plurality of rotatable-element components of a first class in said first preferred position on said first carrier, and establishing a second electric polarity on said one of said plurality of rotatable-element components of a second class in said second preferred position on said second carrier.

20. The method of claim 15 or 16 wherein said first manipulation of said one of said plurality of rotatable-element components of a first class and said second manipulation of said one of said plurality of rotatable-element components of a second class comprises establishing a first adhesion-promoting layer on said one of said plurality of rotatable-element components of a first class in said first preferred position on said first carrier, and establishing a second adhesion-promoting layer on said one of said plurality of rotatable-element components of a second class in said second preferred position on said second carrier.

21. The method of claim 15 or 16 wherein said first manipulation of said one of said plurality of rotatable-element components of a first class and said second manipulation of said one of said plurality of rotatable-element components of a second class comprises establishing a hydrogen-terminated surface on said one of said plurality of rotatable-element components of a first class in said first preferred position on said first carrier, and establishing a hydroxyl-terminated surface on said one of said plurality of rotatable-element components of a second class in said second preferred position on said second carrier.

22. A method for assembling a composite rotatable-element component using a plurality of rotatable-element components of a first class and a plurality of rotatable-element components of a second class, wherein said plurality of rotatable-element components of a first class are defined by a first common response or responses to incident electromagnetic radiation of interest, and wherein said plurality of rotatable-element components of a second class are defined by a second common response or responses to said incident electromagnetic radiation of interest;

said method comprising the steps of:

performing a first manipulation on one of said plurality of rotatable-element components of a first class and performing a second manipulation on one of said plurality of rotatable-element components of a second class such that the potential energy of interest of said one of said plurality of rotatable-element components of a first class and said one of said plurality of rotatable-element components of a second class is minimized when said one of said plurality of rotatable-element components of a first class and said one of said plurality of rotatable-element components of a second class touch at a contact point, and performing a third manipulation of said one of said plurality of rotatable-element components of a first class and said one of said plurality of rotatable-element components of a second class such that said one of said plurality of rotatable-element components of a first class and said one of said plurality of rotatable-element components of a second class touch at said contact point.

23. The method of claim 22 wherein said first manipulation of said one of said plurality of rotatable-element components of a first class and said second manipulation of said one of said plurality of rotatable-element components of a second class comprises establishing an electrostatic polarity between said one of said plurality of rotatable-element components of a first class and said one of said plurality of rotatable-element components of a second class.

24. The method of claim 22 wherein said first manipulation of said one of said plurality of rotatable-element components of a first class and said second manipulation of said one of said plurality of rotatable-element components of a second class comprises establishing a first magnetic polarity on said one of said plurality of rotatable-element components of a first class, and establishing a second magnetic polarity on said one of said plurality of rotatable-element components of a second class.

25. The method of claim 22 wherein said first manipulation of said one of said plurality of rotatable-element components of a first class and said second manipulation of said one of said plurality of rotatable-element components of a second class comprises establishing a first electric polarity on said one of said plurality of rotatable-element components of a first class, and establishing a second electric polarity on said one of said plurality of rotatable-element components of a second class.

26. The method of claim 22 wherein said first manipulation of said one of said plurality of rotatable-element components of a first class and said second manipulation of said one of said plurality of rotatable-element components of a second class comprises establishing a first adhesion-promoting layer on said one of said plurality of rotatable-element components of a first class, and establishing a second adhesion-promoting layer on said one of said plurality of rotatable-element components of a second class.

27. The method of claim 22 wherein said first manipulation of said one of said plurality of rotatable-element components of a first class and said second manipulation of said one of said plurality of rotatable-element components of a second class comprises establishing a hydrogen-terminated surface on said one of said plurality of rotatable-element components of a first class, and establishing a hydroxyl-terminated surface on said one of said plurality of rotatable-element components of a second class.

28. The method of claim 1 further comprising performing a third manipulation of said composite rotatable-element component such that said composite rotatable-element component is heated while said composite rotatable-element component is in free fall through a fluid; and performing a fourth manipulation of said composite rotatable-element component such that said composite rotatable-element component is cooled while said composite rotatable-element component is in free fall through said fluid.

29. The method of claim 28 wherein said fluid is a gas.

30. The method of claim 2, wherein said one of said plurality of rotatable-element components of a first class in said hardened form is characterized by a first response to incident electromagnetic radiation of interest and said one of said plurality of rotatable-element components of a second class in said hardened form is characterized by a second response to said incident electromagnetic radiation of interest.

31. The method of claim 30, wherein said second manipulation of said one of said plurality of rotatable-element components of a first class in liquid or melt form and said one of said plurality of rotatable element components of a second class in liquid or melt form comprises any of the processes of cooling, curing, exposure to ultraviolet light, exposure to infrared light, or irradiation.

32. The method of claim 15, wherein said one of said plurality of rotatable-element components of a first class in said hardened form is characterized by a first response to incident electromagnetic radiation of interest and said one of said plurality of rotatable-element components of a second class in said hardened form is characterized by a second response to said incident electromagnetic radiation of interest.

33. The method of claim 30, 3, 31, 5, 32, or 16 wherein said incident electromagnetic energy of interest is characterized by a set of wavelengths comprising a subset of the set of wavelengths of visible light.

34. A system for assembling a composite rotatable-element components from a plurality of rotatable-element components of a first class and a plurality of rotatable-element components of a second class, wherein said plurality of rotatable-element components of a first class are defined by a first common response or responses to incident electromagnetic radiation of interest, and wherein said plurality of rotatable-element components of a second class are defined by a second common response or responses to said incident electromagnetic radiation of interest, said system comprising:
- a first carrier that can accommodate in one first preferred position one of said plurality of rotatable-element components of a first class,
- a second carrier that can accommodate in one second preferred position one of said plurality of rotatable-element components of a second class,
- a first dispersing means for dispersing said one of said plurality of rotatable-element components of a first class to said first preferred position;
- a second dispersing means for dispersing said one of said plurality of rotatable-element components of a second class to said second preferred position;
- a first manipulation means for touching said one of said plurality of rotatable-element components of a first class to said one of said plurality of rotatable-element components of a second class at a contact point, and
- a second manipulation means for bonding said one of said plurality of rotatable-element components of a first class and said one of said plurality of rotatable-element components of a second class into one of said composite rotatable-element components.

35. The system of claim 34 wherein said first manipulation means for touching said one of said plurality of rotatable-element components of a first class to said one of said plurality of rotatable-element components of second class at said contact point comprises
a conventional contact-mask-alignment system.

36. The system of claim 34 wherein said first manipulation means for touching said one of said plurality of rotatable-element components of a first class to said one of said plurality of rotatable-element components of second class at said contact point comprises
a roll-roll system.

37. The system of claim 34, 35, or 36 wherein said plurality of rotatable-element components of a first class and said plurality of rotatable-element components of a second class comprise
any of polyethylene, polyester, carnuba wax, castor wax, epoxy, pigments, ferroelectric ceramics, or ferromagnetic materials.

38. The system of claim 34, 35, or 36 wherein said first carrier and said second carrier comprise
any of silicone rubber, glass, silicon, aluminum, polymethyl-methacrylate, or polycarbonate.

39. The system of claim 34, 35, or 36 wherein said first carrier comprises
a first microstructured surface containing first microrecesses and first micropeaks.

40. The system of claim 34, 35, or 36 wherein said first carrier comprises
a first microstructured surface containing first microrecesses and first micropeaks, and
said second carrier comprises
a second microstructured surface containing second microrecesses and second micropeaks.

41. The system of claim 34, 35, or 36 wherein said first carrier comprises
a first microstructured surface containing first microrecesses and first micropeaks, and
said second carrier comprises
a second microstructured surface containing second microrecesses and second micropeaks, and
said first microrecesses are arranged in a hexagonal pattern on said first microstructured surface, and
said second microrecesses are arranged in a hexagonal pattern on said second microstructured surface.

42. The system of claim 34, 35, or 36 wherein said first carrier and said second carrier comprise
glass beneath layers of etched RISTON.

43. The system of claim 34, 35, or 36 wherein said first carrier comprises
a first microstructured surface containing first microrecesses and first micropeaks,
wherein said first microrecesses and said first micropeaks are formed by embossing.

44. The system of claim 34, 35, or 36 further comprising
a third manipulation means for passing said composite rotatable-element components through a sieve,
wherein said sieve sorts well-formed composite rotatable-element components from non-well-formed composite rotatable-element components.

45. The system of claim 34, 35, or 36 further comprising
a third manipulation means for passing said composite rotatable-element components through a heating tower,
wherein said heating tower performs a fourth manipulation of said composite rotatable-element components such that said composite rotatable-element components are heated while said composite rotatable-element components are in free fall through a fluid; and
wherein said heating tower performs a fifth manipulation of said composite rotatable-element components such that said composite rotatable-element components are cooled while said composite rotatable-element components are in free fall through said fluid.

46. The system of claim 34, 35, or 36 further comprising
a third manipulation means for passing said composite rotatable-element components through a sieve,
wherein said sieve sorts well-formed composite rotatable-element components from non-well-formed composite rotatable-element components, and
a fourth manipulation means for passing said well-formed composite rotatable-element components through a heating tower,
wherein said heating tower performs a fifth manipulation of said well-formed composite rotatable-element components such that said well-formed composite rotatable-element components are heated while said well-formed composite rotatable-element components are in free fall through a fluid; and wherein said heating tower performs a sixth manipulation of said well-formed composite rotatable-element components such that said well-formed composite rotatable-element components are cooled while said well-formed composite rotatable-element components are in free fall through said fluid.

47. The system of claim 34, 35, or 36 wherein said set of wavelengths of said incident electromagnetic energy of interest comprise a subset of the set of wavelengths of visible light.

* * * * *